(12) United States Patent
Yokochi

(10) Patent No.: US 7,365,888 B2
(45) Date of Patent: Apr. 29, 2008

(54) IMAGE READ APPARATUS

(75) Inventor: Atsushi Yokochi, Chiryuu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1026 days.

(21) Appl. No.: 10/619,579

(22) Filed: Jul. 16, 2003

(65) Prior Publication Data
US 2004/0012830 A1    Jan. 22, 2004

(30) Foreign Application Priority Data
Jul. 19, 2002    (JP)    ............................... 2002-211223
Jul. 19, 2002    (JP)    ............................... 2002-211224

(51) Int. Cl.
H04N 1/04    (2006.01)
H04N 1/40    (2006.01)

(52) U.S. Cl. ...................... 358/482; 358/483; 358/443; 358/444; 358/445; 358/403

(58) Field of Classification Search ................ 358/482, 358/483, 443–445, 486, 474, 497, 505, 506, 358/487, 512–514, 403, 404, 450, 498; 250/208.1, 250/216, 234–236; 382/312; 348/294, 298, 348/272, 276, 322, 323, 231.99, 231.2
See application file for complete search history.

(56) References Cited

U.S. PATENT DOCUMENTS 4,434,503 A    2/1984    Tanaka et al.
5,767,901 A    6/1998    Kimura
2002/0145675 A1   10/2002    Yoshihara et al.
2004/0012829 A1*   1/2004    Takahashi .................... 358/474
2004/0047006 A1*   3/2004    Kato ........................... 358/474
2005/0078339 A1*   4/2005    Hori ........................... 358/445

FOREIGN PATENT DOCUMENTS

| JP | A-56-39676 | 4/1981 |
| JP | A-9-9001 | 1/1997 |
| JP | A-2001-346013 | 12/2001 |
| JP | A-2002-185699 | 6/2002 |

* cited by examiner

*Primary Examiner*—Cheukfan Lee
(74) *Attorney, Agent, or Firm*—Oliff & Berridge, PLC

(57) ABSTRACT

There is disclosed an image read apparatus including an image sensor including: first and second sensors including light receiving devices arranged in one row; a first shift register for outputting the pixel signals of all the light receiving devices of the first sensor; and second and third shift registers for outputting the even-numbered and odd-numbered pixel signals of the light receiving devices of the second sensor, in which invalid data is prevented from being written in a memory. The pixel signals outputted from the first to third shift registers constituting a CCD image sensor with the same transfer clock are selected and taken in via an AFE in a time division. The taken pixel data is successively sampled in a data sampling block and stored in a memory. Moreover, when the sampling timing is controlled in a take-in signal generation circuit, the pixel data stored in the memory is limited to indicate the pixel number of each shift register.

15 Claims, 15 Drawing Sheets

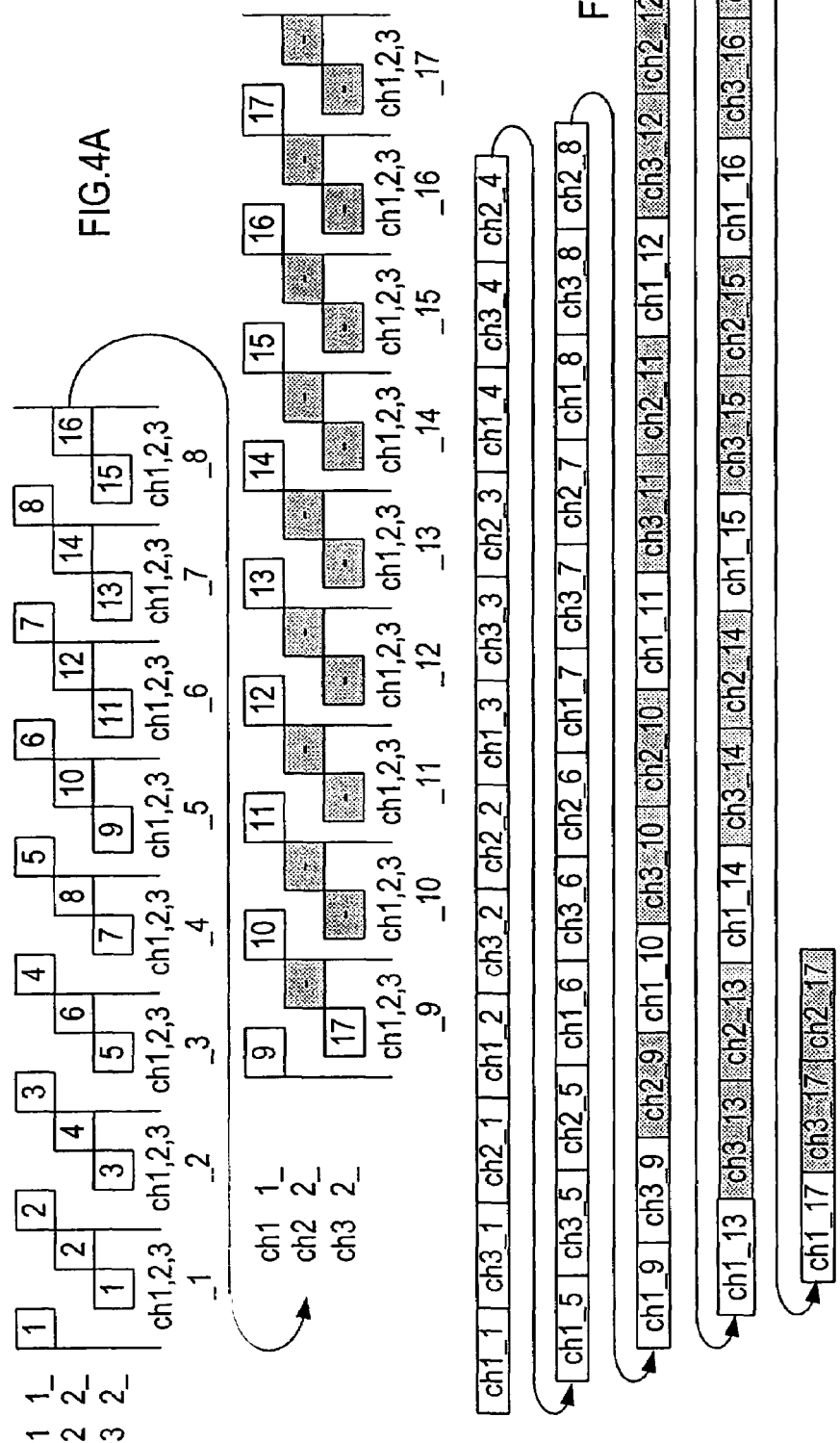

FIG.5A

| ch1_1 | ch1_2 | ch1_3 | ch1_4 | ch1_5 | ch1_6 | ch1_7 | ch1_8 | ch1_9 | ch1_10 | ch1_11 | ch1_12 | ch1_13 | ch1_14 | ch1_15 | ch1_16 | ch1_17 |
|---|---|---|---|---|---|---|---|---|---|---|---|---|---|---|---|---|
| ch3_1 | ch3_2 | ch3_3 | ch3_4 | ch3_5 | ch3_6 | ch3_7 | ch3_8 | ch3_9 | ch3_10 | ch3_11 | ch3_12 | ch3_13 | ch3_14 | ch3_15 | ch3_16 | ch3_17 |
| ch2_1 | ch2_2 | ch2_3 | ch2_4 | ch2_5 | ch2_6 | ch2_7 | ch2_8 | ch2_9 | ch2_10 | ch2_11 | ch2_12 | ch2_13 | ch2_14 | ch2_15 | ch2_16 | ch2_17 |

FIG.5B

| ch1_1 | ch1_2 | ch1_3 | ch1_4 | ch1_5 | ch1_6 | ch1_7 | ch1_8 | ch1_9 | ch1_10 | ch1_11 | ch1_12 | ch1_13 | ch1_14 | ch1_15 | ch1_16 | ch1_17 |
|---|---|---|---|---|---|---|---|---|---|---|---|---|---|---|---|---|
| ch3_1 | ch3_2 | ch3_3 | ch3_4 | ch3_5 | ch3_6 | ch3_7 | ch3_8 | ch3_9 | | | | | | | | |
| ch2_1 | ch2_2 | ch2_3 | ch2_4 | ch2_5 | ch2_6 | ch2_7 | ch2_8 | | | | | | | | | |

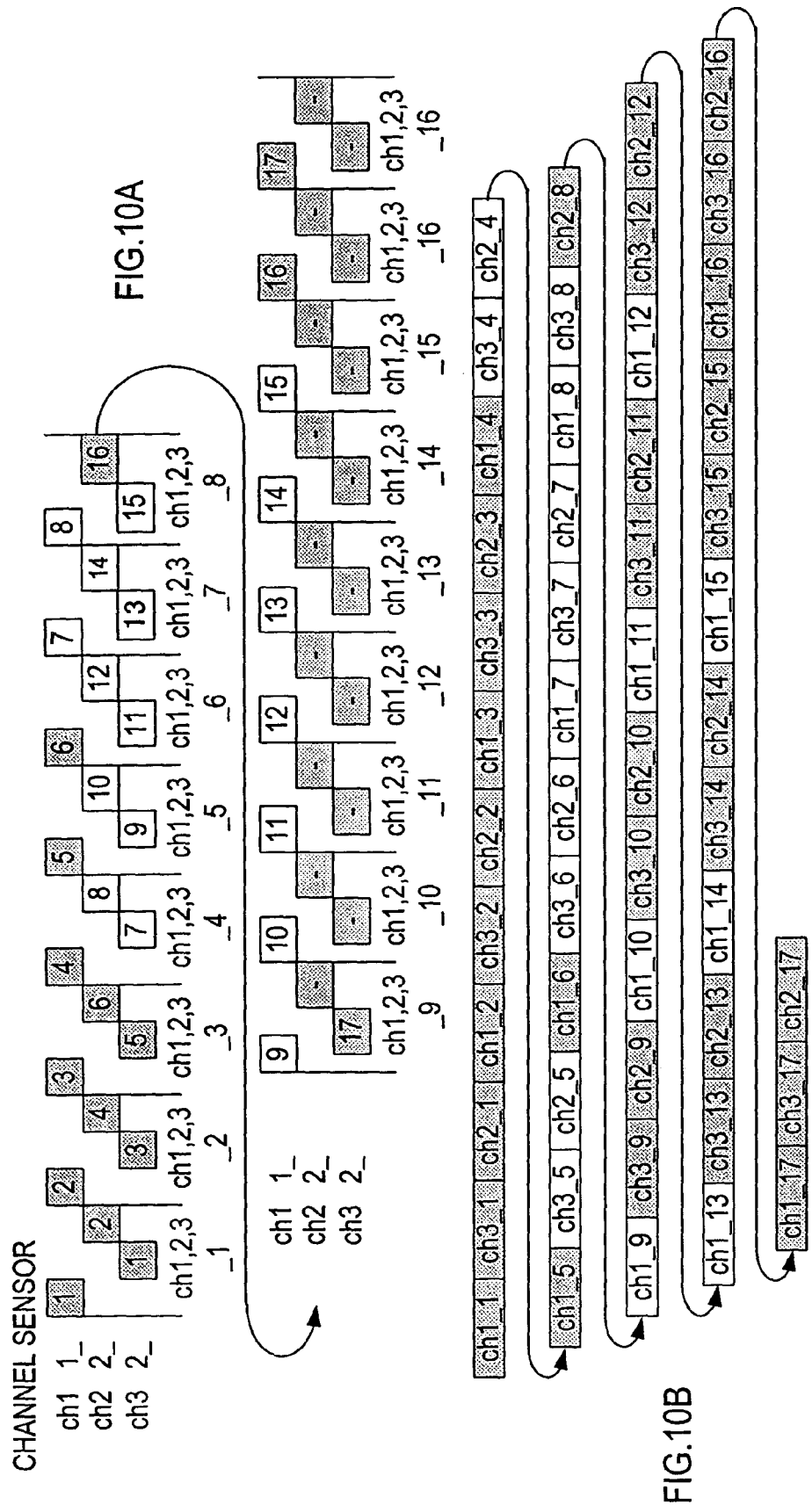

FIG.11A

| ch1_1 | ch1_9 | ch1_17 |
| ch3_1 | ch3_9 | ch3_17 |
| ch2_1 | ch2_9 | ch2_17 |
| ch1_2 | ch1_10 | |
| ch3_2 | ch3_10 | |
| ch2_2 | ch2_10 | |
| ch1_3 | ch1_11 | |
| ch3_3 | ch3_11 | |
| ch2_3 | ch2_11 | |
| ch1_4 | ch1_12 | |
| ch3_4 | ch3_12 | |
| ch2_4 | ch2_12 | |
| ch1_5 | ch1_13 | |
| ch3_5 | ch3_13 | |
| ch2_5 | ch2_13 | |
| ch1_6 | ch1_14 | |
| ch3_6 | ch3_14 | |
| ch2_6 | ch2_14 | |
| ch1_7 | ch1_15 | |
| ch3_7 | ch3_15 | |
| ch2_7 | ch2_15 | |
| ch1_8 | ch1_16 | |
| ch3_8 | ch3_16 | |
| ch2_8 | ch2_16 | |

FIG.11B

| ch3_4 |
| ch2_4 |
| ch3_5 |
| ch2_5 |
| ch3_6 |
| ch2_6 |
| ch1_7 |
| ch3_7 |
| ch2_7 |
| ch1_8 |
| ch3_8 |
| ch1_9 |
| ch1_10 |
| ch1_11 |
| ch1_12 |
| ch1_13 |
| ch1_14 |
| ch1_15 |

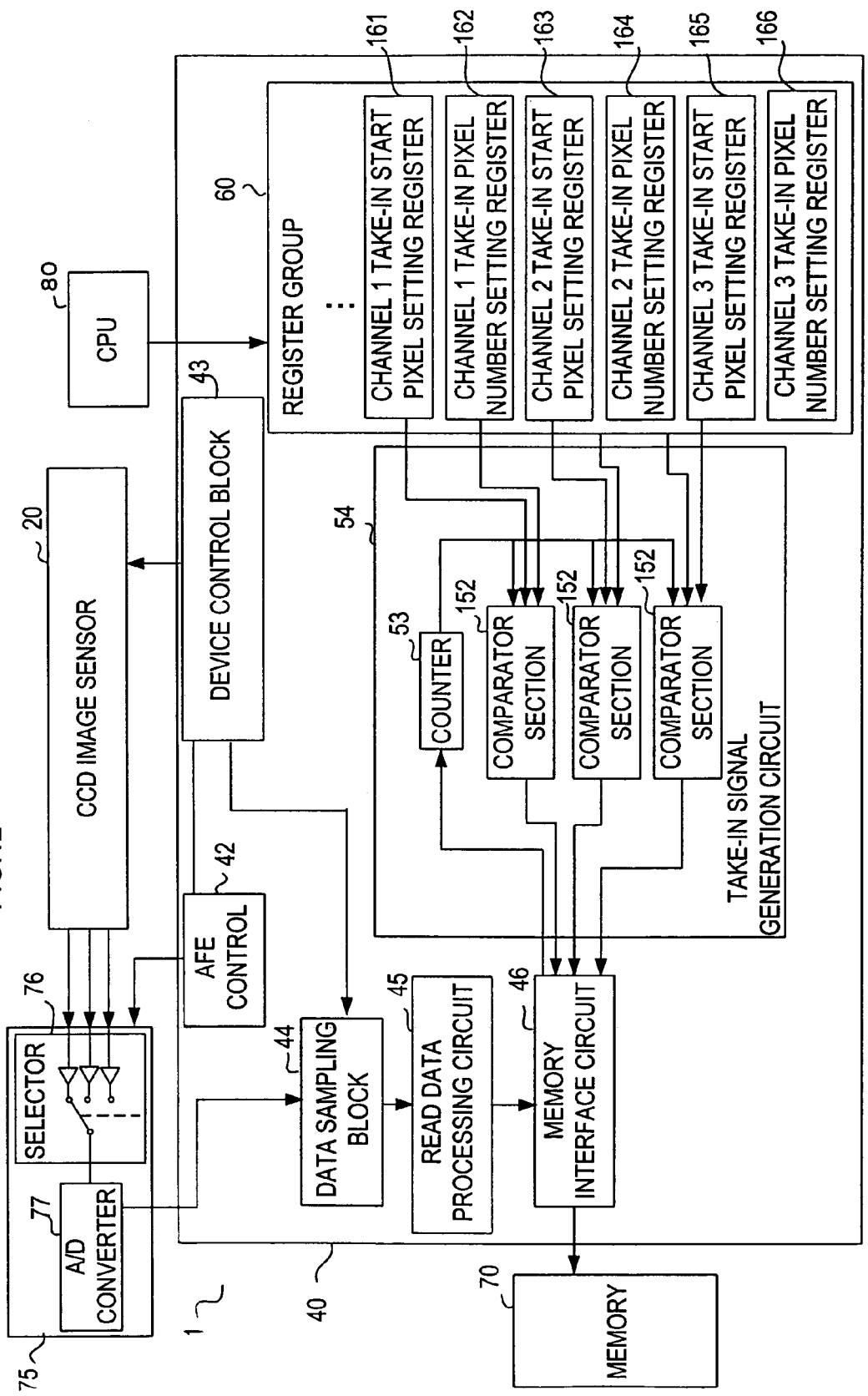

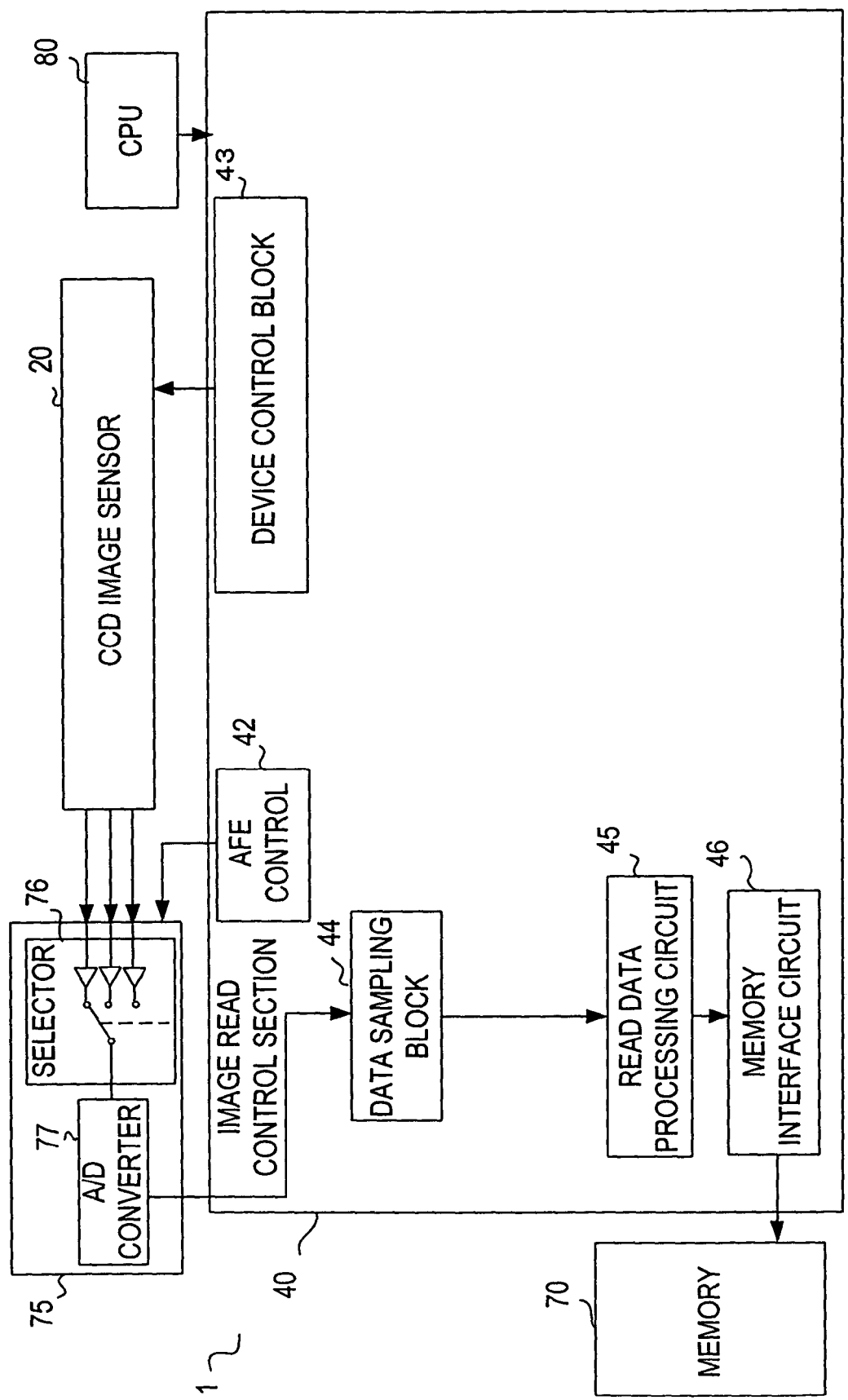

IMAGE READ APPARATUS

BACKGROUND OF THE INVENTION (i) Field of the Invention

The present invention relates to image read apparatuses such as a scanner, FAX, copy machine, and complex machine using an image sensor on which one-dimensionally arranged light receiving devices are mounted to read an image of a draft as electronic data.

(ii) Description of the Related Art

Image read apparatuses such as a scanner, FAX, copy machine, and complex machine have heretofore been known using an image sensor on which one-dimensionally arranged light receiving devices are mounted to read an image of a draft as electronic data.

Additionally, in the reading of the image in the image read apparatus, for example, even a photo image having a large data amount is to be read with high precision, the data amount of the image read with the good precision is to be reduced for use in transferring the data via FAX, a large amount of drafts is to be read as fast as possible even if an image quality drops, or the image is to be read with an acceptable image quality and data amount. In this manner, the desired way of reading the image data varies in accordance with the use application of the read image and situations at a read time.

On the other hand, the resolution of the read image data has heretofore been increased/decreased in outputting the data, so that the image quality and data amount are changed to handle various applications.

Moreover, as one of the methods for solving the problem, for various uses, as shown in FIG. 2, a CCD linear image sensor has been developed. The sensor includes: two sensors (first sensor 21, second sensor 22) including a plurality of light receiving devices arranged in a main scanning direction; a first shift register 25 for outputting pixel signals (17 signals in the example of FIG. 2) of all the light receiving devices of the first sensor 21; a second shift register 26 for outputting even-numbered pixel signals (eight signals in the example of FIG. 2) of the light receiving devices of the second sensor 22; and a third shift register 27 for outputting odd-numbered pixel signals (nine signals in the example of FIG. 2) of the light receiving devices of the second sensor 22.

On the other hand, for the transmission of the pixel signals from this CCD image sensor, electric charges accumulated in the light receiving devices are successively outputted as the pixel signals by the shift register. When the outputs from the three shift registers are simultaneously outputted, there is a shift register in which the pixel signals fast run out. This is because the number of pixel signals outputted from each shift register is different. However, the outputs from three shift registers are usually controlled in one system. Therefore, while there is even one shift register in which the pixel signals to be outputted are left, the output operation of the pixel signals continues. Therefore, even the shift register in which the pixel signals run out undergoes the operation for outputting the pixel signals, and invalid data is transmitted and recorded in a memory.

In a conventional image read apparatus, as shown in FIG. 15, the pixel signal read by a CCD linear image sensor (hereinafter referred to as the CCD sensor 20) which is the above-described CCD linear image sensor is selected by a selector 76. An A/D converter 77 converts the signal into a digital signal (pixel data), a data sampling block 44 in an image read control section 40 receives pixel data, and a memory interface circuit 46 in the image read control section 40 writes the pixel data into a memory 70. In the image read apparatus constituted in this manner, the pixel signals are transmitted as follows.

First, in the CCD sensor 20, as shown in FIG. 3, voltages are outputted to output terminals OUT1 to OUT3 in accordance with the electric charges transferred from the shift registers for each edge of transfer clocks $\phi 1$, $\phi 2$. That is, the pixel signal of the image received by the light receiving device is outputted. At this time, pixel information is not included in ninth and subsequent edges of the transfer clock for the second shift register, and is not included in tenth and subsequent signals for the third shift register.

Next, the pixel signal outputted from the CCD sensor 20 is received by the selector 76, and the pixel signals of three channels received by the selector 76 are selected in order and outputted to the A/D converter 77 within period of the transfer clocks $\phi 1$, $\phi 2$ as shown in FIG. 4A. In the A/D converter 77, an analog signal is converted to a digital signal and outputted as a serial data string in the same period as that of the output of the selector 76 as shown in FIG. 4B.

At this time, the outputs from the second shift register in the ninth and subsequent edges of the transfer clock and the outputs from the third shift register in the tenth and subsequent edges do not include pixel information, but the selector 76 selects the channels of the second and third shift registers in the case where the outputs from those channels do not include pixel information. Therefore, the A/D converter 77 carries out the operation for forming the digital signal even with respect to the channels which do not include the pixel information, and the signals are transmitted as the serial data string (hatched part of FIGS. 4A and 4B), and recorded in the memory as shown in FIG. 5A.

In this manner, the invalid data which does not include the pixel information uses a memory region, and there is a problem that a memory capacity is compressed. Moreover, the invalid data is included at the time of image processing using the pixel data recorded in the memory. There is another problem that it takes time to read the data from the memory and a process of selecting the invalid data is required in the stage of the image processing.

Additionally, in the normal CCD image sensor, light receiving ends have many manufacturing problems of the light receiving device and many eclipses of an optical system. Moreover, it is impossible to obtain an output with a stably high precision from the light receiving ends. For these reasons, the signals from the opposite ends of the given range of a light receiving device string are not regarded as valid, the light receiving device in the middle part of the light receiving device string is defined as valid pixels, and the signals from this range of the valid pixels are used as the pixel signal obtained by picking up the image of a subject.

However, the outputs from the CCD image sensor are outputted in order from the signal of the endmost light receiving device, and the signals other than the valid pixels (i.e., invalid pixels) are outputted in the same manner as the valid pixels.

Therefore, the signals of the invalid pixels are written in the memory in the same manner as the signals of the valid pixels. Moreover, the invalid pixels are selected so that the invalid pixels are not used in the stage of the image processing using the read pixel signal.

Therefore, the data of the invalid pixels uses the memory region, and there is a problem that the memory capacity is compressed. Moreover, the invalid data is included in the image processing using the read data, and therefore the data to be processed increases. There is another problem that it takes time to read the data and to select the invalid pixel data.

Especially, in the above-described CCD image sensor including two rows of sensors and having three outputs, there are invalid pixels for two sensors, and therefore the number of invalid pixels is large with respect to the outputs from one sensor. Moreover, with three simultaneous outputs, the second and third shift registers start to output the valid pixels before the pixels of the first shift register become valid. Therefore, the data of valid and invalid pixels are mixed and recorded (stored). When the read image data is subjected to the image processing later, the efficiency of the selection process of the information is bad.

For example, as shown in FIG. 9, the valid pixels of the light receiving devices in the first and second sensors 21 and 22 in the CCD linear image sensor correspond to nine pixels including the seventh to 15th pixels from an output end direction. A take-in start pixel in the first shift register 25 corresponds to the seventh pixel from the output end direction and the number of taken pixels is nine. The take-in start pixel in the second shift register 26 corresponds to the fourth pixel from the output end direction and the number of taken pixels is four. The take-in start pixel in the third shift register 27 corresponds to the fourth pixel from the output end direction and the number of taken pixels is five. In this case, when the output of the pixel signal from the CCD linear image sensor is recorded (stored) in the memory as such, as shown in FIG. 11A, the data of the valid pixels (part without hatching of FIG. 11A) is mixed with the data of the invalid pixels (hatched part of FIG. 11A) and recorded (stored).

In this CCD linear image sensor includes two rows of sensors and having three outputs, the influence of the invalid pixels is large, and raises a problem. This problem also occurs also in reading only a part of the draft in a main scanning direction as an object.

SUMMARY OF THE INVENTION

The present invention has been developed in consideration of the problems, and an object thereof is to provide an image read apparatus using a CCD linear image sensor including: two sensors; a first shift register that outputs pixel signals of all light receiving devices of one sensor; a second shift register that outputs even-numbered pixel signals of the light receiving devices of the other sensor; and a third shift register that outputs odd-numbered pixel signals of the light receiving devices of the same sensor as that of the second shift register, in which invalid data is prevented from being written in a memory.

To achieve this and other objects, the present invention provides an image read apparatus including: a first sensor including a plurality of light receiving devices arranged in a main scanning direction; a second sensor which includes a plurality of light receiving devices arranged in the main scanning direction and which is disposed at a predetermined distance from the first sensor in a sub-scanning direction; a first output unit that outputs a pixel signal obtained from each light receiving device of the first sensor in an arrangement order of the light receiving devices; a second output unit that outputs pixel signals obtained from even-numbered light receiving devices in the light receiving devices constituting the second sensor in the arrangement order of the light receiving devices; a third output unit that outputs the pixel signals obtained from odd-numbered light receiving devices in the light receiving devices constituting the second sensor in the arrangement order of the light receiving devices; a conversion unit that converts the pixel signals from the respective output units into pixel data which are digital signals; and a pixel data storage unit that stores the pixel data outputted from the conversion unit.

Moreover, the image read apparatus further includes: an information storage unit in which information with respect to the number of valid pixels (number of valid pixel signals) outputted per scanning by each output unit is stored for each output; and a pixel data storage limiting unit that limits the pixel data to be stored in the pixel data storage unit based on the information stored in the information storage unit.

As a result, according to the image read apparatus of the present invention, only the pixel data corresponding to the valid pixel signals outputted from the respective output units can be stored in the pixel data storage unit, and invalid data can be prevented from being written to the storage unit.

In the present invention, the first output unit may output the pixel signals obtained from the respective light receiving devices of the first sensor in the arrangement order of the light receiving devices for a predetermined period. The second output unit may output the pixel signals obtained from the even-numbered light receiving devices in the light receiving devices constituting the second sensor in the arrangement order of the light receiving devices for the predetermined period, and the third output unit may output the pixel signals obtained from the odd-numbered light receiving devices in the light receiving devices constituting the second sensor in the arrangement order of the light receiving devices for the predetermined period.

The information storage unit may include a pixel number information storage unit that stores pixel number information with respect to the number of pixels outputted per scanning by each output unit.

In this case, the pixel data storage limiting unit may limit the number of pixel data stored by the pixel data storage unit based on the pixel number information so that the number of pixel data to be stored in the pixel data storage unit agrees with the number of pixels outputted from each output unit.

In the above constitution, only the pixel data that agrees with the number of pixels outputted per scanning by each output unit can be stored in the pixel data storage unit. Accordingly, a storage region in the pixel data storage unit is not wasted. The process in an image processing apparatus using the pixel data stored in the pixel data storage unit can be reduced.

Additionally, the pixel number information storage unit may also store information showing the number of pixels outputted per scanning by each output unit as the pixel number information per each output unit.

The following relation can be seen in the number of pixels outputted by each output unit, for example. When the numbers of light receiving devices of the first and second sensors are the same and even, for example, the number of pixels outputted by the first output unit is the same as that of the light receiving devices of the first sensor. On the other hand, the number of pixels respectively outputted by the second and third output units is the half of the number of light receiving devices of the second sensor (i.e., the half of the number of pixels outputted from the first output unit). When the numbers of light receiving devices of the first and second sensors are the same and odd, for example, the number of pixels outputted by the first output unit is the same as that of the light receiving devices of the first sensor. On the other hand, the number of pixels outputted by the second output unit is the number of pixels obtained by subtracting 1 from the number of pixels of the second sensor and further dividing the number by 2 (that is, the number obtained by subtracting 1 from the number of pixels outputted from the first output unit and further dividing the number by 2). The number of pixels of the third output unit is obtained by subtracting 1 from the number of pixels of the second sensor, further dividing the number by 2, and adding 1 to the number (that is, the number obtained by subtracting 1 from the number of pixels outputted from the first output unit, further dividing the number by 2, and adding 1 to the number). In this manner, the numbers of pixels outputted from the respective output units are related to one another. When the number of pixels outputted by the first output unit is known, the numbers of pixels outputted by the other two output units can be set by a simple calculation unit. This relation can be used to provide the following image read apparatus according to the present invention.

That is, in the image read apparatus, information of the number of pixels outputted per scanning by the first output unit is stored as the pixel number information in the pixel number information storage unit. The pixel data storage limiting unit obtains the number of pixels outputted per scanning by each output unit based on the pixel number information, and limits the pixel data stored in the pixel data storage unit based on the number of pixels.

As a result, according to the image read apparatus of the present invention, the pixel number information storage unit can hold only one piece of information. Therefore, the storage region of the pixel number information storage unit can be reduced, and the apparatus can be simplified.

Moreover, the pixel data stored in the pixel data storage unit may be limited at any time in and after the output of the output unit. However, when the limiting is carried out upstream, the invalid data may not be processed in the process carried out downstream.

To solve the problem, in the image read apparatus of the present invention, the pixel data storage limiting unit may limit the pixel data stored in the pixel data storage unit immediately after the conversion unit outputs the pixel data.

As a result, according to the image read apparatus of the present invention, the pixel data immediately after the output of the conversion unit can be limited. Accordingly, the invalid data does not flow into a transmission path of the pixel data in and after the limitation. Therefore, when the processing apparatus of the pixel data is disposed on the transmission path, a useless process by the invalid data can be removed.

Moreover, on the path of the transmission of the pixel data, the transmission of the pixel data to be stored in the pixel data storage unit may be limited further downstream. Alternatively, for example, in the image read apparatus of the present invention, the limiting may be carried out in the stage of write into the pixel data storage unit.

That is, in the image read apparatus, the pixel data storage unit includes: a storage section in which pixel data is stored; and a write unit for writing the pixel data outputted from the conversion unit into the storage section. The pixel data storage limiting unit limits a write operation of the pixel data into the storage section by the write unit.

As a result, according to the image read apparatus of the present invention, the write can be limited in the stage of the write into the storage section.

Moreover, while the invalid pixel data flows, an unnecessary operation is not performed, if possible, for a purpose of suppressing power consumption.

For example, in the image read apparatus of the present invention, the conversion unit may be constituted to execute the conversion of the pixel signal from each output unit into the pixel data in accordance with a conversion command inputted from the outside. The pixel data storage limiting unit may control the input of the conversion command into the conversion unit so that the conversion unit converts only the pixel signal outputted from each output unit into the pixel data.

As a result, according to the image read apparatus of the present invention, the conversion is not carried out while the invalid data flows, and the power consumption can be reduced.

In the image read apparatus of the present invention, respective ranges of the light receiving devices in the first and second sensors for outputting valid pixel signals may be defined.

Furthermore, the information storage unit may include a start pixel information storage unit in which start pixel information with respect to the number of pixels required until the valid pixel signal starts to be outputted in the pixel signals outputted per scanning by each output unit is stored.

In this case, the pixel data storage limiting unit may limit the pixel data to be stored in the pixel data storage unit per scanning by each output unit based on the start pixel information.

As a result, in the pixel data corresponding to the pixel signals from the light receiving devices, the pixel data corresponding to the valid pixels can be stored in the pixel data storage unit. Accordingly, the storage of the invalid pixels into the pixel data storage unit can be reduced.

In the start pixel information storage unit, information showing the number of pixels required until the valid pixel signal starts to be outputted in the pixel signals outputted per scanning by each output unit may be stored per each output unit as the start pixel information.

Additionally, the following relation can be seen in the output number of the pixel signals required until the pixel signal outputted from each output unit turns into the pixel signal corresponding to the valid pixel, for example. When the numbers of invalid pixels of the first and second sensor in the beginning of the read are the same and even, for example, the number of pixels in the beginning of the output corresponding to the invalid pixels in the signals outputted by the first output unit is the same as that of the invalid pixels in the beginning of the read in the first sensor. On the other hand, the number of pixels at the start of the output corresponding to the invalid pixels in the signals outputted by the second and third output unit is the half of the number of invalid pixels in the beginning of the read in the second sensor (i.e., the half of the number of pixels in the beginning of the read corresponding to the invalid pixels in the signals outputted from the first output unit). When the number of invalid pixels of the first and second sensors in the beginning of the read is the same and odd, for example, the number of pixels at the start of the output corresponding to the invalid pixels in the signals outputted from the first output unit is the same as that of the invalid pixels in the beginning of the read in the first sensor. On the other hand, the number of the pixels in the beginning of the output corresponding to the invalid pixel in the signals outputted from the second output unit is the number obtained by subtracting 1 from the number of invalid pixels in the beginning of the read in the second sensor and further dividing the number by 2 (that is, the number obtained by subtracting 1 from the number of the pixel at the start of the output corresponding to the invalid pixels among the signals outputted from the first output unit and further dividing the number by 2). The number of pixels at the start of the output corresponding to the invalid pixels in the signals outputted from the third output unit is obtained by subtracting 1 from the number of invalid pixels in the beginning of the read in the second sensor, further dividing the number by 2, and adding 1 to the number (that is, the number obtained by subtracting 1 from the pixel number at the start of the output corresponding to the invalid pixels in the signals outputted from the first output unit, further dividing the number by 2, and adding 1 to the number). In this manner, the pixel numbers required until the respective output units start to output the valid pixels are related to one another. When the pixel number required until the valid pixels are started to be outputted by the first output unit is known, the pixel number required until the valid pixels start to be outputted by the other two output units can be set by the simple calculation unit. This relation can be used to provide the following image read apparatus.

That is, in the image read apparatus of the present invention, the start pixel information storage unit stores information of the pixel number required until the valid pixel signal starts to be outputted in the output per scanning by the first output unit is stored as the start pixel information. The start pixel information storage unit may also store information with respect to parity of the number of valid pixels. In this image read apparatus, the pixel data storage limiting unit obtains the pixel number required until the valid pixel signal starts to be outputted in the output per scanning by each output unit based on the start pixel information, and limits the pixel data stored in the pixel data storage unit based on the pixel number.

As a result, according to the image read apparatus of the present invention, the start pixel information storage unit can hold only one piece of information. Therefore, the storage region of the start pixel information storage unit can be reduced, and the apparatus can be simplified.

Moreover, the invalid pixel lies not only in an output start part of the signal from the light receiving device but also in a final part. For this reason, with the information of the pixel number at which the output of the valid pixel ends, the final part can also be controlled.

In the image read apparatus of the present invention, the information storage unit may include a pixel number information storage unit that stores pixel number information with respect to the number of valid pixels outputted per scanning by each output unit. In this case, the pixel data storage limiting unit may limit the number of pixel data to be stored per scanning by each output unit based on the start pixel information and pixel number information so as to prevent the pixel data storage unit from storing pixel data after end of the output of the valid pixel signal.

As a result, according to the present invention, the data of the invalid pixels of the final part can also be prevented from being stored in the pixel data storage unit. Accordingly, the storage region of the pixel data storage unit can effectively be used, and the image processing can be facilitated.

Moreover, also for the number of valid pixels, in the same manner as in the pixel number required until the valid pixel signal starts to be outputted, there is a specific relation among the respective output units, and there can be provided the image read apparatus of the present invention.

That is, in the image read apparatus according to the present invention, the number of valid pixels outputted per scanning by the first output unit is stored as the pixel number information in the pixel number information storage unit. The pixel data storage limiting unit obtains the number of valid pixels outputted per scanning by each output unit based on the pixel number information, and limits the pixel data to be stored by the pixel data storage unit based on the number of valid pixels.

As a result, according to the image read apparatus of the present invention, the pixel number information storage unit may hold only one piece of information. Therefore, the storage region of the pixel number information storage unit can be reduced, and the apparatus can be simplified.

Moreover, the pixel data may be limited at any time in and after the output of the output unit. However, when the limiting is carried out upstream, the invalid data may not be processed in the process carried out downstream.

To solve the problem, in the image read apparatus of the present invention, the pixel data storage limiting unit limits the pixel data to be stored by the pixel data storage unit immediately after the conversion unit outputs the pixel data.

As a result, according to the image read apparatus of the present invention, the pixel data immediately after the output of the conversion unit can be limited. Accordingly, the invalid data for the processing does not flow in and after the limitation. Therefore, when the processing apparatus for processing the pixel data is disposed on the transmission path, the useless process by the invalid data can be removed.

Moreover, on the path of the transmission of the pixel data, the limiting may be performed further downstream. Alternatively, for example, in the image read apparatus of the present invention, the limiting may be carried out in the stage of the write into the pixel data storage unit.

That is, in the image read apparatus of the present invention, the pixel data storage unit includes a storage section in which the pixel data is stored; and a write unit for writing pixel data outputted from the conversion unit into the storage section. The pixel data storage limiting unit limits a write operation of the pixel data into the storage section by the write unit.

As a result, according to the image read apparatus of the present invention, the write can be limited in the stage of the write into the storage section.

Moreover, while the invalid pixel data flows, the unnecessary operation is not performed, if possible, for the purpose of suppressing the power consumption.

Therefore, for example, in the image read apparatus of the present invention, the conversion unit may be constituted to execute the conversion of the pixel signal from each output unit into the pixel data in accordance with a conversion command inputted from the outside. The pixel data storage limiting unit may control the input of the conversion command into the conversion unit so that the conversion unit converts the pixel signal corresponding to the valid pixel signal into the pixel data.

As a result, according to the image read apparatus of the present invention, the conversion is not carried out while the invalid data flows, and the power consumption can be reduced.

BRIEF DESCRIPTION OF THE DRAWINGS

FIG. 4A is an explanatory view of the state of the pixel signal according to the first embodiment, and FIG. 4B is an explanatory view of the state of the pixel data according to the first embodiment;

FIG. 5A is an explanatory view showing a conventional recorded state of the pixel data, and FIG. 5B is an explanatory view showing a recorded state of the pixel data in a memory of the first embodiment;

FIG. 10A is an explanatory view of the state of the pixel signal according to the third embodiment, and FIG. 10B is an explanatory view of the state of the pixel data according to the third embodiment;

FIG. 11A is an explanatory view showing the conventional recorded state of the pixel data, and FIG. 11B is an explanatory view showing the recorded state of the pixel data in the memory of the third embodiment;

FIG. 12 is a diagram showing the whole constitution of the image read apparatus according to a fourth embodiment;

FIG. 15 is a diagram showing the whole constitution of a conventional image read apparatus.

DETAILED DESCRIPTION OF PREFERRED EMBODIMENTS

Embodiments of the present invention will be described hereinafter with reference to the accompanying drawings, but the present invention is not limited to the following concrete embodiments, and can be carried out in various modes.

First Embodiment

Figure 1:
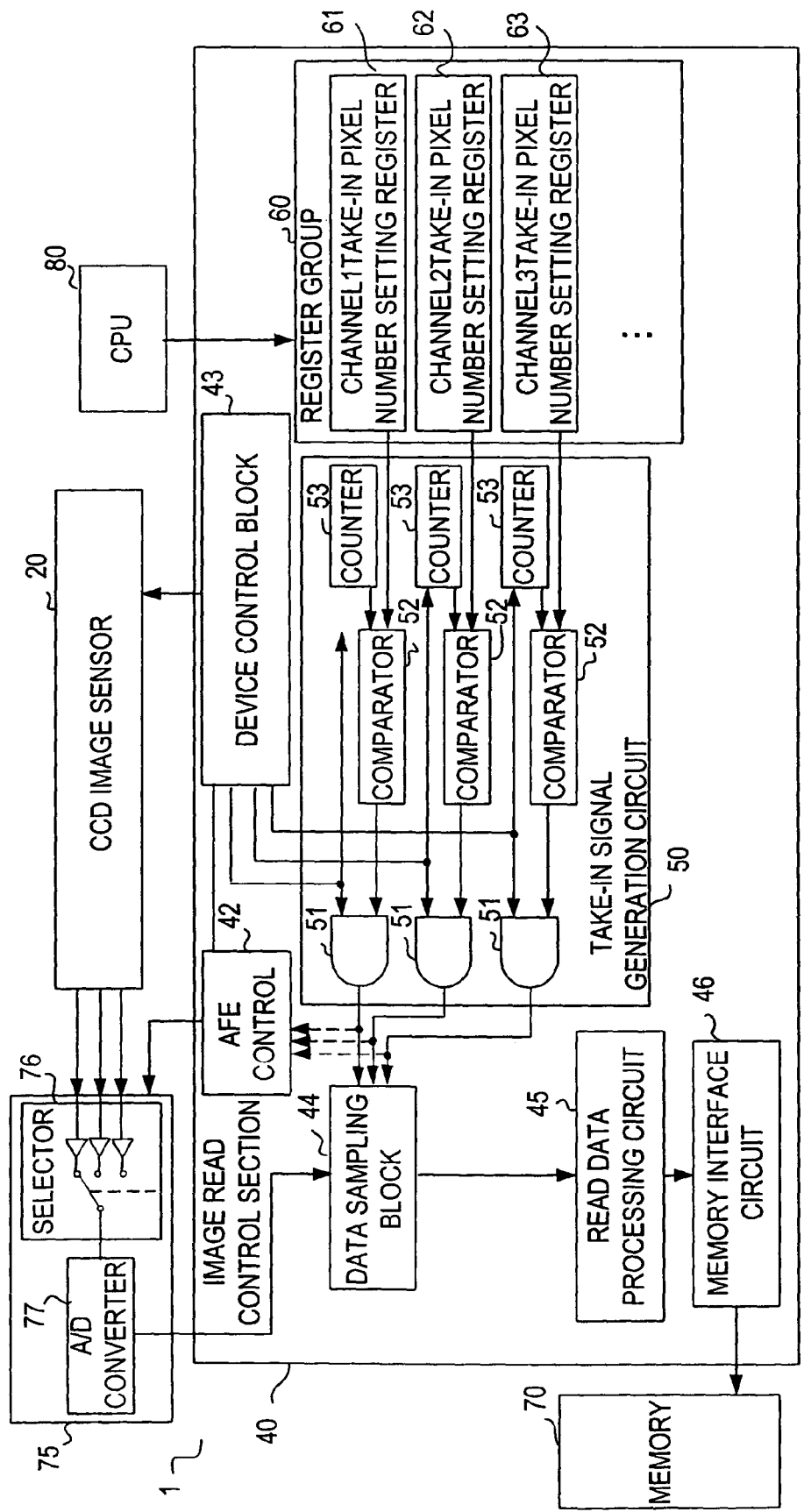
FIG. 1 is a diagram showing the whole constitution of an image read apparatus according to a first embodiment.

FIG. 1 is a block diagram showing an inner constitution of an image read apparatus 1 to which the present invention is applied.

For the image read apparatus 1 of the present embodiment, a pixel signal of a draft image sensed/received by a charge coupled diode (CCD) linear image sensor 20 is converted to a digital signal (pixel data) and outputted in an analog front end (AFE) 75. The pixel data is received by a data sampling block 44 in an image read control section 40, and written in a memory 70 by a memory interface circuit 46 in the image read control section 40.

As shown in FIG. 1, the image read apparatus 1 of the present embodiment includes: the CCD linear image sensor (hereinafter referred to as the CCD sensor) 20; a CPU 80 for controlling the operation of the whole image read apparatus 1; the AFE 75 for switching analog data of three outputs from the CCD sensor 20 by a selector 76 while converting the data to the digital signal and outputting the signal; the memory 70 for recording (storing) the pixel data; and the image read control section 40 for controlling the operations of the CCD sensor 20, AFE 75, and memory 70.

Figure 2:
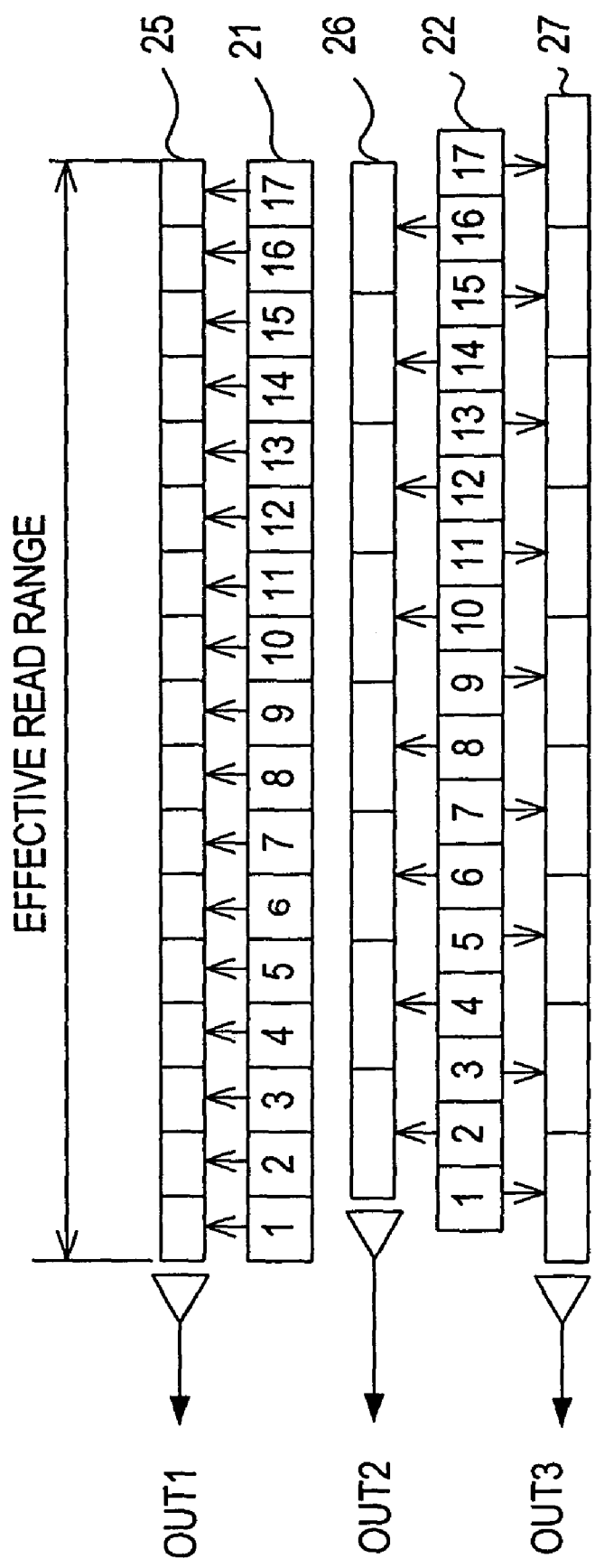
FIG. 2 is a diagram showing the constitution of a CCD linear image sensor according to the first embodiment.

It is to be noted that, as shown in FIG. 2, the CCD sensor 20 is constituted of a first sensor 21, second sensor 22, first shift register 25, second shift register 26, and third shift register 27.

Moreover, in the first sensor 21, the light receiving devices for accumulating electric charges in accordance with a received light amount are one-dimensionally arranged. For the second sensor 22, the same light receiving device row as that of the first sensor 21 is disposed apart from the first sensor 21 by the predetermined number of lines (six lines in this embodiment) in a sub-scanning direction, and shifted from the first sensor 21 by the half of the device in a main scanning direction.

Moreover, the first shift register 25 individually receives all the electric charges accumulated by the light receiving devices of the first sensor 21, shifts the electric charges toward an output terminal OUT1, and successively outputs voltages as pixel signals in proportion to the electric charges via the output terminal OUT1. The second shift register 26 individually receives the electric charges of the even-numbered light receiving devices of the second sensor 22, and successively outputs the voltages via an output terminal OUT2 in the same manner as in the first shift register 25. The third shift register 27 individually receives the electric charges of the odd-numbered light receiving devices of the second sensor 22, and successively outputs the voltages via an output terminal OUT3 in the same manner as in the first shift register.

Furthermore, in the first and second sensors 21, 22, in the example shown in FIG. 2, the number of light receiving devices is 17. Therefore, the number of pixel signals outputted from the first shift register is 17, the number of pixel signals outputted from the second shift register is eight, and the number of pixel signals outputted from the third shift register is nine.

Additionally, the AFE 75 includes: the selector 76 for selecting and outputting the output via the output terminals OUT1 to OUT3 of the CCD sensor 20; and an A/D converter 77 for converting the signal from the selector 76 into the digital signal. Moreover, the AFE 75 includes three channels which sample-hold the inputs from the CCD sensor 20, can adjust gains, and have an offset correction function. The output from the output terminal OUT1 of the CCD sensor 20 is received as a channel CH1, the output of the output terminal OUT2 is received as a channel CH2, and the output of the output terminal OUT3 is received as a channel CH3. The channel of the signal outputted is selected by the selector 76 based on a command from the outside, and the signal is switched and outputted every predetermined time.

Moreover, the image read control section 40, constituted of a so-called ASIC (application specific integrated circuit), includes: an AFE control block 42 for controlling the operation of the AFE 75; a device control block 43 for controlling the operation of the CCD sensor 20; and the data sampling block 44 which includes a first in first out (FIFO) memory and which samples the pixel data from the AFE 75 to record the data in the FIFO memory. The section also includes: a take-in signal generation circuit 50 for generating a timing signal to sample the pixel data in the data sampling block 44; a read data processing circuit 45 for subjecting the sampled pixel data to corrections such as shading; the memory interface circuit 46 for writing the pixel data from the read data processing circuit 45 into the memory 70; and a register group 60 for storing set values of operation conditions in the respective blocks in the image read control section 40.

It is to be noted that the take-in signal generation circuit 50 includes: counters 53 which count up by pulse signals from the device control block 43 for each of the channels CH1 to CH3; comparators 52 which are logical calculation circuits for comparing the value of a take-in pixel number setting register of the corresponding channel with that of the counter 53; and AND devices 51 which output logical sums of the outputs of the comparators 52 and the pulse signals from the device control block 43.

Moreover, the register group 60 includes: a channel 1 take-in pixel number setting register 61 in which the number of pixel signals outputted via the output terminal OUT1 of the CCD sensor 20 is stored; a channel 2 take-in pixel number setting register 62 in which the number of pixel signals outputted via the output terminal OUT2 is stored; a channel 3 take-in pixel number setting register 63 in which the number of pixel signals outputted via the output terminal OUT3 is stored; and the like. The content of each register is written by the CPU 80 at a start time of the image read apparatus 1.

Furthermore, the device control block 43 outputs, a shift gate signal SH which is a pulse signal having a period determined by an output time of the pixel signal from the CCD sensor 20, transfer clocks φ1, φ2 which have the period determined by the characteristics of the shift registers and which are two rectangular waves different from each other by a 180 degree phase, and a reset signal RS which is the pulse signal emitted in the same period as that of the transfer clock to the CCD sensor 20. Furthermore, the device control block 43 outputs the pulse signal to the line leading to the take-in signal generation circuit 50 which corresponds to the channel selected by the selector 76. It is to be noted that this pulse signal is synchronized with a timing to switch the channel in the selector 76 of the AFE 75. The counter 53 of the take-in signal generation circuit 50 is reset in the timing of the shift gate signal SH.

Here, the operation of the present image read apparatus will be described. In the operation, the pixel signals of the first and second sensors 21, 22 of the CCD sensor 20 are outputted from the first to third shift registers 25 to 27, and written as the pixel data into the memory 70.

It is to be noted that the pixel data read in the present operation is handled as the pixel data in which the pixel data from the second sensor 22 and the pixel data from the first sensor 21 at a time when the CCD sensor 20 is moved by six lines are alternately arranged. Accordingly, the pixel data is used as the pixel data which has a resolution twice that of one sensor.

First, in the CCD sensor 20, the electric charges accumulated in the first sensor 21 for each light receiving device which has received light from a draft between the previous shift gate signal SH and the present shift gate signal SH are moved to the first shift register 25 at the falling of the shift gate signal SH. Similarly in the second sensor 22, the electric charges of the even-numbered light receiving devices move to the second shift register 26, and the electric charges of the odd-numbered light receiving devices move to the third shift register 27.

Figure 3:
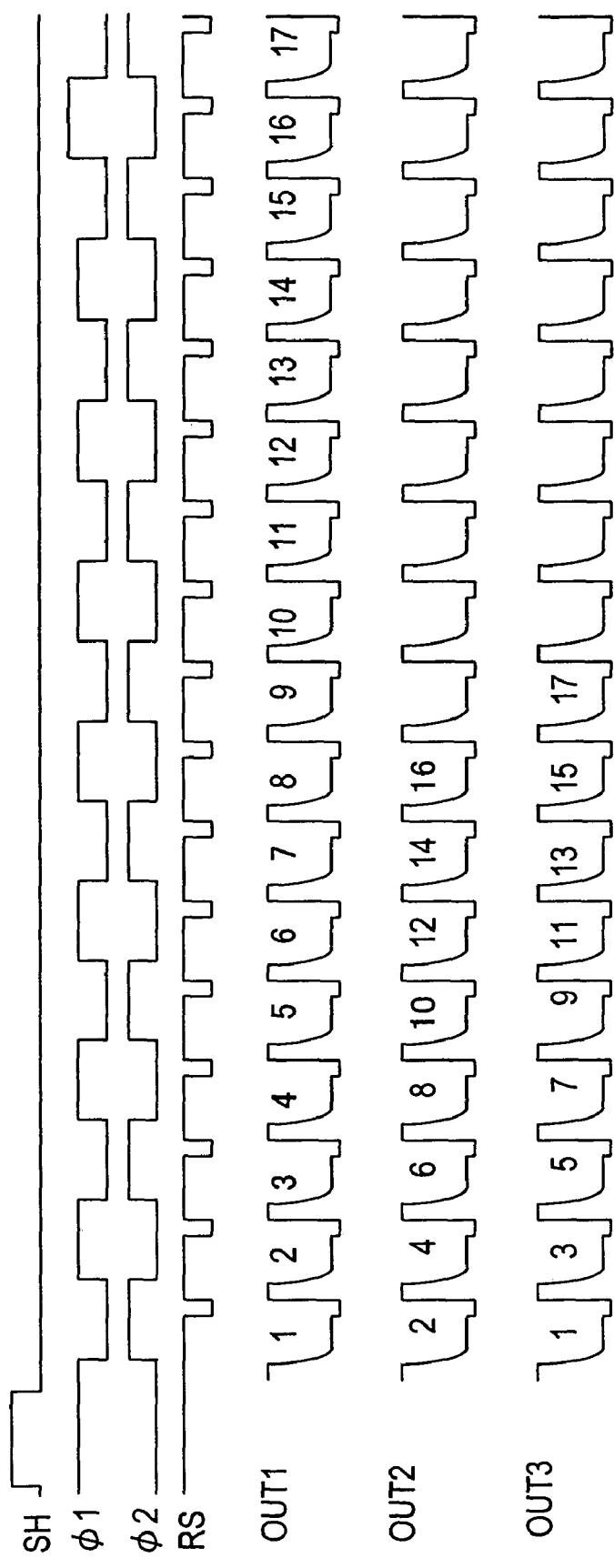
FIG. 3 is a timing chart showing the states of signals in the CCD sensor according to the first embodiment.

Next, as shown in FIG. 3, for the outputs of the respective output terminals OUT1 to OUT3 of the CCD sensor 20, the electric charges are cleared and the outputs return to reference voltages at the rising of the reset signal RS. Moreover, in the edges of the transfer clocks φ1, φ2, the electric charges of the respective shift registers are shifted in an output terminal direction, and the electric charge of the endmost shift register on the output terminal side is shifted to the output terminal. Therefore, the voltages are outputted to the output terminals OUT1 to OUT3 in accordance with the shifted electric charges. That is, the pixel signal of the image received by the light receiving device is outputted.

Subsequently, from when voltage changes in the output terminals OUT1 to OUT3 are stabilized until the next reset signal RS is transmitted, the respective channels CH1 to CH3 of the AFE 75 sample-hold the pixel signals of the output terminals OUT1 to OUT3. The preset gains are applied to the sample-held pixel signals via the AFE control block 42, and offset correction is carried out.

The electric charges of the respective sensors are shifted by the respective shift registers, sample-held for each of the channels CH1 to CH3 of the AFE 75, and the offset correction is carried out. This operation is repeated every edge of the transfer clocks φ1, φ2.

Next, the signals sample-held in the respective channels CH1 to CH3 of the AFE 75 and offset-corrected are outputted while the selector 76 successively selects three channels in the periods of the transfer clocks φ1, φ2 as shown in FIG. 4A.

Next, the signal outputted from the selector 76 is converted to the digital signal from the analog signal in the same period as that of the output of the selector 76 by the A/D converter 77 as shown in FIG. 4B. For example, the digital signal (pixel data) constituted of eight bits per pixel is successively outputted.

On the other hand, in the take-in signal generation circuit 50, the pulse signal from the device control block 43 is received in the circuit corresponding to the channel of the pixel data outputted from the A/D converter 77 in the timing when the A/D converter 77 outputs the pixel data. A sampling trigger signal is outputted to the data sampling block 44 in accordance with the value of the counter 53.

For example, when the pixel data of the channel CH2 is outputted from the A/D converter 77, the pulse signal is outputted to the counter 53 corresponding to the channel CH2 from the device control block 43. The counter 53 counts up the value of the counter. Subsequently, the value of the counter 53 is compared with that of the channel 2 take-in pixel number setting register 62 by the comparator 52. When the value of the counter 53 is not more than "8" which is the value of the channel 2 take-in pixel number setting register 62, the output of the comparator 52 then turns to "1". At this time, the pulse signal from the device control block 43 also enter the corresponding AND device 51. While the pulse signals are transmitted, the AND device 51 outputs "1".

Similarly, with respect to the pixel data of the channel CH1, the output of the counter 53 is not more than "17" which is the value of the channel 1 take-in pixel number setting register 61. With respect to the pixel data of the channel CH3, the output of the counter 53 is not more than "9" which is the value of the channel 3 take-in pixel number setting register 63. In this case, while the pulse signals are transmitted from the device control block 43, the AND devices 51 output "1".

Next, the pixel data outputted from the AFE 75 is sampled in the timing when any output of three AND devices 51 of the take-in signal generation circuit 50 indicates "1" in the data sampling block 44, and stored in the FIFO memory. At this time, the information of the channel is added to the pixel data based on the received channel of the AND device 51. For example, two-bits data indicating the information of the channel is added to the pixel data.

Next, the pixel data stored in the FIFO memory of the data sampling block 44 is taken out by the read data processing circuit 45, and subjected to the calculation processes such as a shading process, gamma correction, and dark correction in accordance with the channel of the pixel data.

Next, the pixel data calculated/processed in the read data processing circuit 45 is written in order in the predetermined address of the memory 70 by the memory interface circuit 46.

Next, when the next shift gate signal SH arrives, each counter in the image read control section 40 is reset. Moreover, the CCD sensor 20 transfers the electric charges accumulated in the first and second sensors 21, 22 while the previous pixel signals have been outputted again to the respective shift registers. Subsequently, the CCD sensor 20 similarly outputs the pixel signals, and records (stores) the signals in the memory 70. This operation is repeated.

[Effect]

The counters 53 of the take-in signal generation circuit 50 indicate the values larger than the pixel numbers set in the channel 1 to 3 take-in pixel number setting registers 61 to 63 (i.e., the pixel number is 17 for the channel CH1, eight for the channel CH2, and nine for the channel CH3). Thereafter, the outputs of the comparators 52 turn to "0". Therefore, enable signals are not outputted to the pixel data of the channel outputted from the AFE 75 from the AND devices 51, and the pixel data are not sampled in the data sampling block 44. Therefore, as shown in FIG. 5B, only the pixel data corresponding to the number of valid pixels outputted from the first to third setting registers 25 to 27 is recorded (stored).

Accordingly, the invalid pixel data recorded (stored) into the memory 70 can be reduced, and the memory 70 may not be unnecessarily large. Also when the data of the memory is outputted to an external image processing apparatus, the data amount is reduced, the data can quickly be outputted, and the processing in the external image processing apparatus can also be reduced.

Second Embodiment

A second embodiment has the same purpose and use as those of the first embodiment. For the constitution of the image read control section 40, in the first embodiment, the signal of the take-in signal generation circuit 50 is used to control the sampling timing of the data sampling block 44 and to limit the pixel data to be transmitted. On the other hand, in the second embodiment, the pixel data written in the memory 70 by the memory interface circuit 46 is limited in a take-in signal generation circuit 54.

Figure 6:
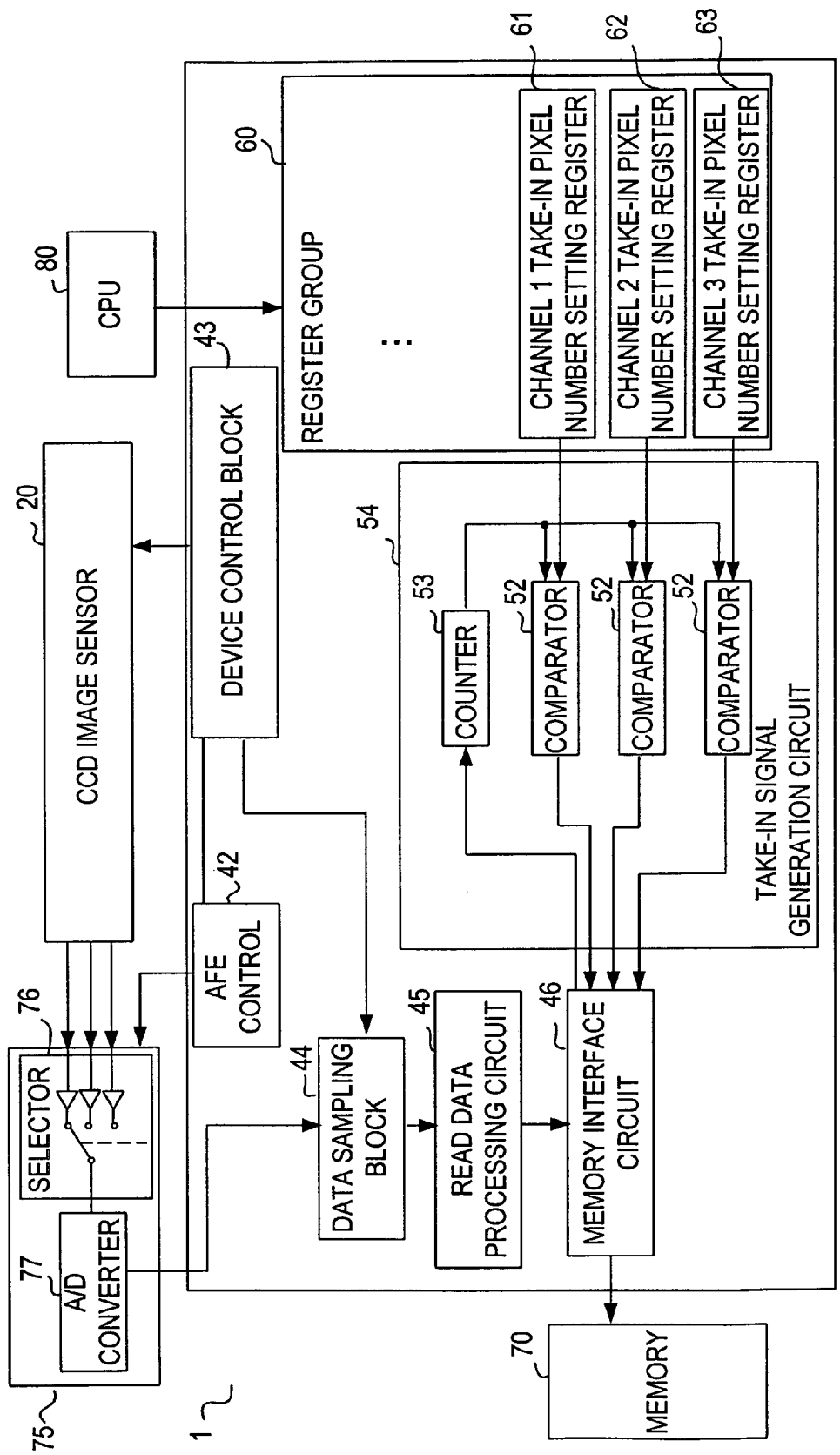
FIG. 6 is a diagram showing the whole constitution of the image read apparatus according to a second embodiment.

For the constitution, as shown in the whole constitution of FIG. 6, the device control block 43 outputs the sampling timing signal to the data sampling block 44, and the take-in signal generation circuit 54 outputs a signal to the memory interface circuit 46 to permit the write of the pixel data into the memory 70.

Moreover, the memory interface circuit 46 has a counter function, and outputs the pulse signal for the count-up to the take-in signal generation circuit 54 every time three data (i.e., the signal data for three channels of the CCD sensor 20) are received.

Subsequently, the take-in signal generation circuit 54 counts up the counter 53 in response to the pulse signal from the memory interface circuit 46. The values of the channel 1 to 3 take-in pixel number setting registers 61 to 63 are compared with the value of the counter 53 by the respective comparators 52. When the value of the counter 53 is not more than the set value of the respective registers 61, 62, 63, the corresponding comparator 52 outputs "1" to each input port of the memory interface circuit 46.

When the signal indicating "1" is in the input port from the take-in signal generation circuit 54 corresponding to the channel information possessed by the received pixel data, the memory interface circuit 46 writes the data into the memory 70.

[Effect]

The data outputted to the memory interface circuit 46 after the value of the counter 53 is larger than the pixel number set in the channel 1 to 3 take-in pixel number setting registers 61 to 63 is not written in the memory 70, since the output of the comparator 52 is "0". Therefore, only the pixel data of the pixel numbers outputted by the first to third shift registers 25 to 27 is recorded (stored) in the memory.

As a result, the effect similar to that of the first embodiment can be obtained.

MODIFICATION EXAMPLE

For example, in the first embodiment, all the three outputs from the output terminals OUT1 to OUT3 of the CCD sensor 20 are recorded (stored) in the memory 70. However, the channel to be selected by the AFE 75 is commanded with respect to the AFE control block 42, and the channel to be selected in the selector 76 is switched in response to the signal from the AFE control block 42, so that only the pixel data of the signal of one of the channels may be recorded (stored) in the memory 70. Alternatively, only the pixel data of two signals of the channels CH2, CH3 can be recorded (stored) in the memory 70. Accordingly, the pixel data is recorded (stored) with the resolution of the first and second sensors, or with the half of the resolution of the second sensor. In this manner, the data can be acquired with the changed read resolution.

Figure 7:
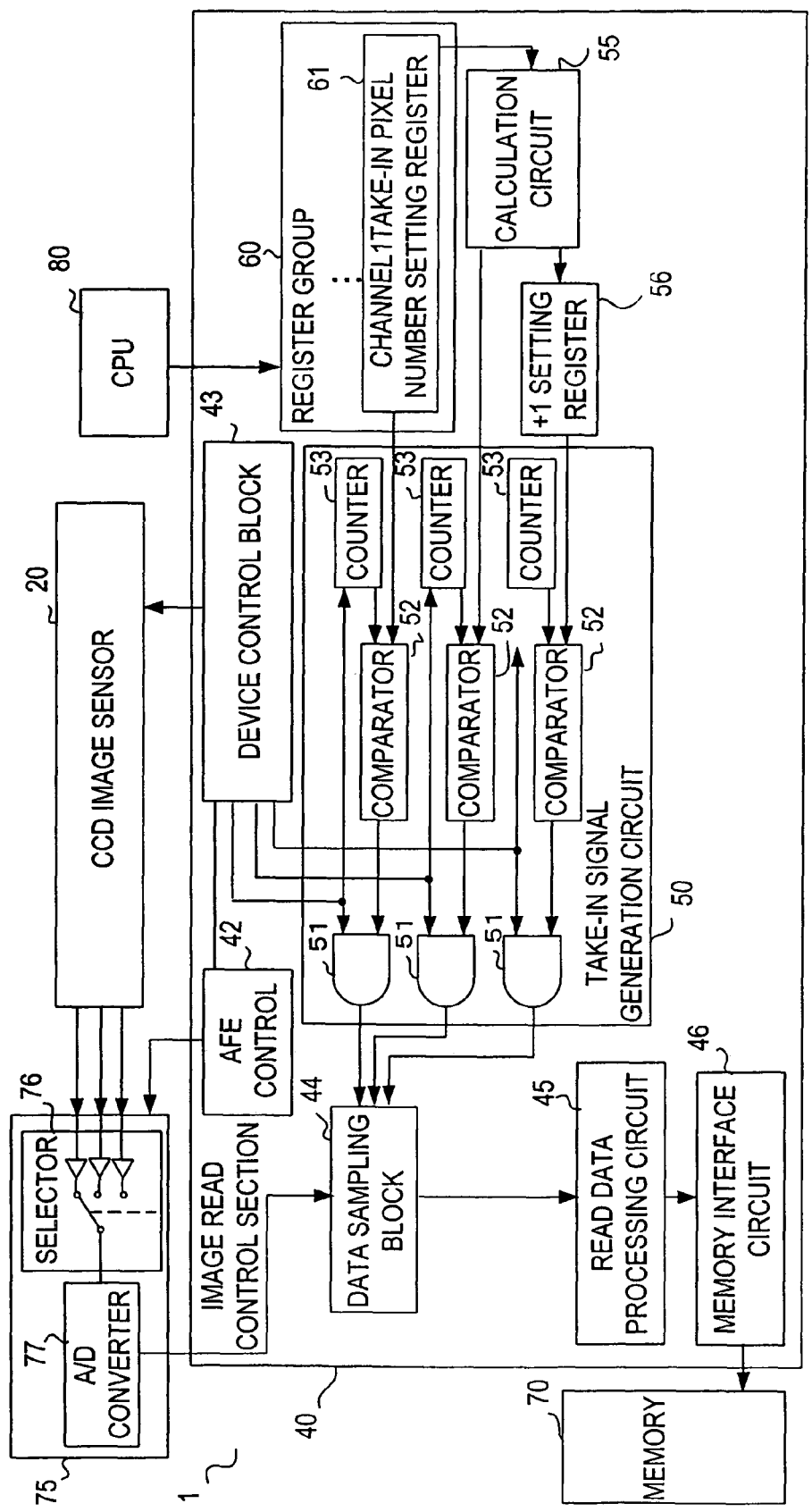
FIG. 7 is a diagram showing the whole constitution of a modification example of the image read apparatus according to the first embodiment.

Moreover, in the first and second embodiments, three channel 1 to 3 take-in pixel number setting registers 61 to 63 have the take-in pixel numbers for the respective channels, but the take-in pixel numbers of the respective channels are related to one another. Therefore, as shown in FIG. 7, for the information in the register group, only the channel 1 take-in pixel number setting register 61 is disposed. A calculation circuit 55 may be disposed to shift binary data indicating the value of the channel 1 take-in pixel number setting register 61 in a direction in which a digit drops by one bit (i.e., to divide the data by 2). A +1 setting register 56 may be disposed in which the values moved outside by the bit shift in the calculation circuit 55 are set ("0" is set, when the value of the channel 1 take-in pixel number setting register 61 is even, and "1" is set, when the value is odd). It is to be noted that the output value of the calculation circuit 55 is used as the channel 2 take-in pixel number in the comparator 52 of the channel CH2. In the comparator 52 of the channel CH3, the value obtained by adding the setting value of the +1 setting register 56 to the output value of the calculation circuit 55 is used as the channel 3 take-in pixel number. In this manner, the value of the channel 1 take-in pixel number setting register 61 may only be set to provide the satisfactory image read apparatus.

Furthermore, the difference of the take-in pixel number between the channels CH2 and CH3 is only one pixel. In this case, the valid pixel number in the channel CH2 is assumed to be the same as that of the channel CH3 having a larger number, and the output of the comparator 52 for the channel CH3 is inputted into the AND device 51 for the channel CH2. The comparator 52 and counter 53 for the channel CH2 may be omitted. Accordingly, the apparatus constitution can further be simplified.

Additionally, as shown by a dotted line in FIG. 1, the signal from the take-in signal generation circuit 50 is inputted into the AFE control block 42, and the A/D converter 77 may be controlled to carry out the operation with respect to the signal of the channel which has received the signal from the take-in signal generation circuit 50. Accordingly, while the invalid data flows, the A/D converter 77 does not operate, and power consumption is reduced.

Third Embodiment

Figure 8:
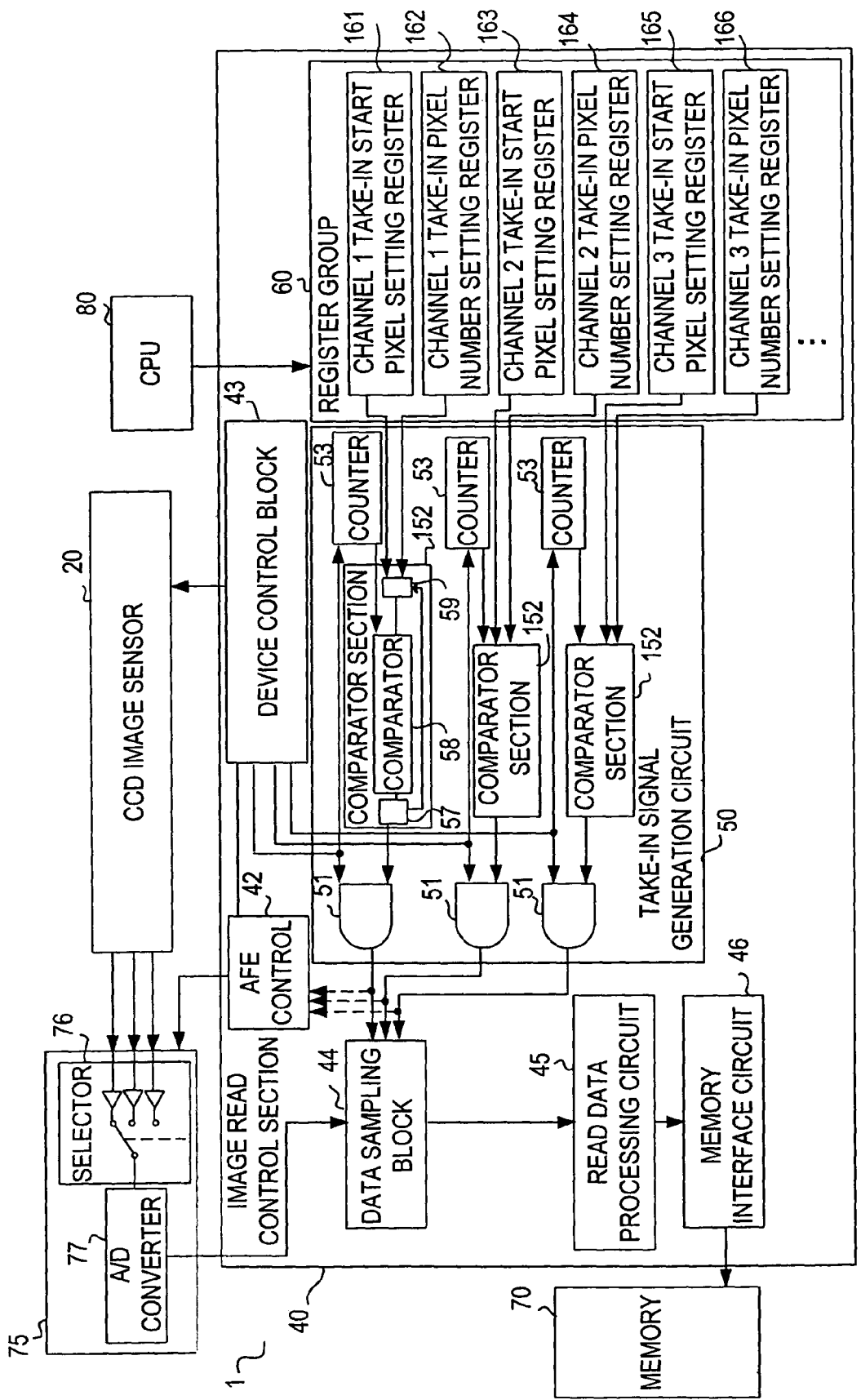
FIG. 8 is a diagram showing the whole constitution of the image read apparatus according to a third embodiment.

FIG. 8 is a block diagram showing the inner constitution of the image read apparatus 1 according to a third embodiment. In FIG. 8, the same components as those of FIG. 1 are denoted with the same reference numerals, and description is omitted. Only the different respects will be described.

Figure 9:
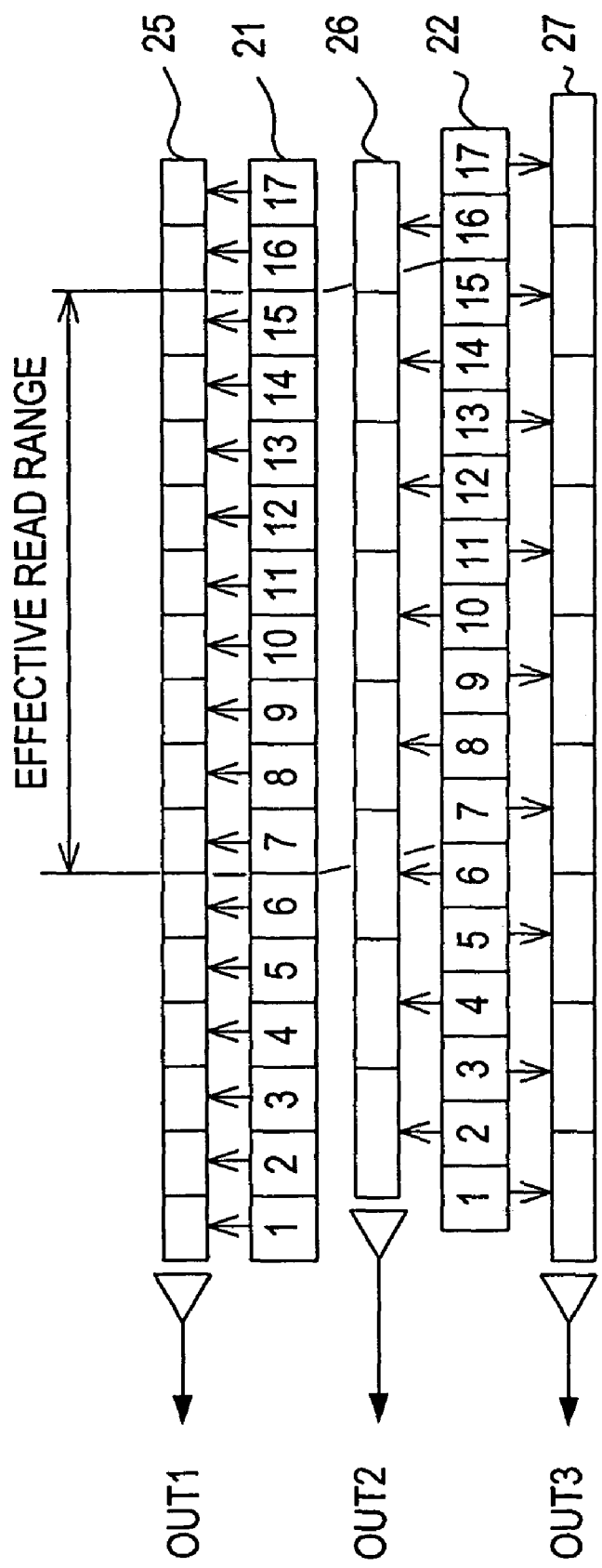
FIG. 9 is a diagram showing the constitution of the CCD linear image sensor according to the third embodiment.

In the CCD sensor 20 of this embodiment shown in FIG. 9, the valid pixels of the light receiving devices of the first and second sensors 21, 22 correspond to nine pixels from the seventh pixel from an output end direction. That is, the take-in start pixel of the first shift register corresponds to the seventh pixel, the number of taken pixels is nine, the take-in start pixel of the second shift register corresponds to the fourth pixel, the number of taken pixels is four, the take-in start pixel of the third shift register corresponds to the fourth pixel, and the number of taken pixels is five.

It is to be noted that the register group 60 includes: a channel 1 take-in start pixel setting register 161 in which the number of take-in start pixels is stored with respect to the signal of the channel CH1; a channel 1 take-in pixel number setting register 162 for storing the value of the number of taken pixels to which the previous number of take-in start pixels is added; similarly a channel 2 take-in start pixel setting register 163 and channel 2 take-in pixel number setting register 164 with respect to the channel CH2; and further a channel 3 take-in start pixel setting register 165 and channel 3 take-in pixel number setting register 166 with respect to the channel CH3. The contents of the respective registers are written by the CPU 80 at the start time of the image read apparatus 1.

Moreover, the take-in signal generation circuit 50 includes: the counters 53 which count up by the pulse signal from the device control block 43 for each channel; the comparator section 152 which are logic calculation circuits for comparing the value of the take-in start pixel setting register and the value of the take-in pixel number setting register of the corresponding channel with the value of the counter 53; and the AND devices 51 for outputting the logical sum of the value of the comparator section 152 and the timing signal from the device control block 43. It is to be noted that the comparator section 152 is constituted of a flip-flop circuit 57, comparator 58, and change-over switch 59. The output of the flip-flop circuit 57 changes by the output of the comparator 58. Particularly, the output of the flip-flop circuit 57 changes when the output of the comparator 58 is switched from "0" to "1". The signal of the flip-flop circuit 57 corresponds to the output of the comparator section 152. Moreover, the comparator 58 compares the value of the counter 53 with that of the change-over switch 59. When the value of the counter 53 is not less than that of the change-over switch 59, "1" is outputted from the comparator 58. In accordance with the state of the output of the flip-flop circuit 57, the change-over switch 59 switches the input into the comparator 58 to the value of the take-in start pixel setting register or the take-in pixel number setting register. When the output of the flip-flop circuit 57 has a value "0", the change-over switch 59 selects the take-in start pixel setting register. When the value is "1", the take-in pixel number setting register is selected.

In the present embodiment, the signals sample-held in the respective channels CH1 to CH3 of the AFE 75 and offset-corrected are outputted while the selector 76 successively selects three channels in the periods of the transfer clocks φ1, φ2 as shown in FIG. 10A.

Next, the signal outputted from the selector 76 is converted to the digital signal from the analog signal in the same period as that of the output of the selector 76 by the A/D converter 77 as shown in FIG. 10B. For example, the digital signal (pixel data) constituted of eight bits per pixel is successively outputted.

In the operation of the image read apparatus constituted as described above, when the pixel data of the channel CH2 is outputted from the A/D converter 77, the pulse signal is outputted to the counter 53 corresponding to the channel CH2 from the device control block 43. The counter 53 counts up. At this time, since the initial value of the flip-flop circuit 57 of the comparator section 152 is "0", the change-over switch 59 selects channel 2 take-in start pixel setting register 163. The value of the register 163 is compared with that of the counter 53 by the comparator 58. When the value of the counter 53 is not less than "4" which is the value of the channel 2 take-in start pixel setting register 163, the output of the comparator 58 turns to "1" from "0". Moreover, the output of the flip-flop circuit 57 turns to "1". While the pulse signal from the device control block 43 is transmitted, the AND device 51 outputs "1".

Subsequently, when the output of the flip-flop circuit 57 is "1", the change-over switch 59 selects the channel 2 take-in pixel number setting register 164, the value of a comparison object is larger than that of the counter 53, and therefore the output of the comparator 58 returns to "0".

Next, when the value of the counter 53 for the channel CH2 is not less than "8" which is the value of the channel 2 take-in pixel number setting register 164, the output of the comparator 58 turns to "1" from "0", and the flip-flop circuit 57 operates to output "0". Even when the pulse signal from the device control block 43 arrives, the output of the AND device 51 remains to be "0".

Similarly, with respect to the pixel data of the channel CH1, the output of the counter 53 is not less than "7" which is the value of the channel 1 take-in start pixel setting register 161 and not more than "15". With respect to the pixel data of the channel CH3, the output of the counter 53 is not less than the value "4" of the channel 3 take-in start pixel setting register 165 and not more than "8". In this case, while the pulse signal from the device control block 43 is transmitted, the AND device 51 outputs "1". With respect to the pixel data of the channel CH1, the output of the counter 53 is not less than the value "16" of the channel 1 take-in pixel number setting register 162. With respect to the pixel data of the channel CH3, the output of the counter 53 is not less than the value "9" of the channel 3 take-in pixel number setting register 166. In this case, even when the pulse signal from the device control block 43 arrives, the output of the AND device 51 remains to be "0".

Next, in the data sampling block 44, the pixel data outputted from the AFE 75 is sampled in the timing when any output of three AND devices 51 of the take-in signal generation circuit 50 indicates "1", and stored in the FIFO memory. At this time, the information of the channel is added to the pixel data based on the received channel of the AND device 51. For example, two-bits data indicating the information of the channel is added to the pixel data.

Next, the pixel data stored in the FIFO memory of the data sampling block 44 is taken out by the read data processing circuit 45, and subjected to the calculation processes such as the shading process, gamma correction, and dark correction in accordance with the channel of the pixel data.

Next, the pixel data calculated/processed in the read data processing circuit 45 is written in order in the predetermined address of the memory 70 by the memory interface circuit 46.

Next, when the next shift gate signal SH arrives, each counter in the image read control section 40 is reset. Moreover, the CCD sensor 20 transfers the electric charges accumulated in the first and second sensors 21, 22 while the previous pixel signals have been outputted again to the respective shift registers. Subsequently, the CCD sensor 20 similarly outputs the pixel signals, and records (stores) the signals in the memory 70. This operation is repeated.

[Effect]

The counters 53 of the take-in signal generation circuit 50 indicate the values not less than the pixel numbers set in the channel 1 to 3 take-in start pixel setting registers 161, 163, 165 (i.e., the pixel number is seven for the channel CH1, four for the channel CH2, and four for the channel CH3). Thereafter, the outputs of the comparator section 152 turn to "1". Therefore, the enable signals from the AND device 51 are outputted to the pixel data of the channel outputted from the AFE 75, and the pixel data are sampled in the data sampling block 44. Moreover, the values of the counter 53 are not less than the pixel numbers set in the channel 1 to 3 take-in pixel number setting registers 162, 164, 166 (i.e., the pixel number is 16 for the channel CH1, eight for the channel CH2, and nine for the channel CH3). Thereafter, the outputs of the comparator section 152 turn to "0". Therefore, the enable signals from the AND devices 51 are not outputted to the pixel data of the channel outputted from the AFE 75, and the pixel data are not sampled in the data sampling block 44.

Therefore, as shown in FIG. 11B, only the pixel data of the valid pixels outputted from the first to third shift registers 25 to 27 is recorded (stored) in the memory.

Accordingly, the invalid pixel data recorded (stored) into the memory 70 can be reduced, and the memory 70 may not be unnecessarily large. Also when the data of the memory 70 is outputted to the external image processing apparatus, the data amount is reduced, and the data can quickly be outputted. For the processing in the external image processing apparatus, it is unnecessary to select the invalid data.

Fourth Embodiment

A fourth embodiment has the same purpose and use as those of the third embodiment. For the constitution of the image read control section 40, in the third embodiment, the signal of the take-in signal generation circuit 50 is used to control the sampling timing of the data sampling block 44. On the other hand, in the fourth embodiment, the data written by the memory interface circuit 46 is limited in the take-in signal generation circuit 54.

For the constitution, as shown in the whole constitution of FIG. 12, the device control block 43 outputs the sampling timing signal to the data sampling block 44, and the take-in signal generation circuit 54 outputs the signal to the memory interface circuit 46 to permit the write of the pixel data into the memory 70.

Moreover, the memory interface circuit 46 has the counter function, and outputs the pulse signal for the count-up to the take-in signal generation circuit 54 every time three data (i.e., the signal data for three channels of the CCD sensor 20) are received.

Subsequently, the take-in signal generation circuit 54 counts up the counter 53 in response to the pulse signal from the memory interface circuit 46. The values of the channel 1 take-in start pixel setting register 161 and channel 1 take-in pixel number setting register 162, channel 2 take-in start pixel setting register 163 and channel 2 take-in pixel number setting register 164, and channel 3 take-in start pixel setting register 165 and channel 3 take-in pixel number setting register 166 are compared with the value of the counter 53 by the respective comparator section 152. When the value of the counter 53 is between "number of take-in start pixels" and "number of take-in start pixels+number of taken pixels−1", the comparator section 152 indicates and outputs "1" to each input port of the memory interface circuit 46.

When the signal indicating "1" is in the input port from the take-in signal generation circuit 54 corresponding to the channel information possessed by the pixel data received from the read data processing circuit 45, the memory interface circuit 46 writes the data into the memory 70.

[Effect]

The data outputted to the memory interface circuit 46 after the value of the counter 53 is not less than the pixel number set in the channel 1 to 3 take-in start pixel setting registers 161, 163, 165 is written in the memory 70 since the output of the comparator section 152 is "1". On the other hand, the data outputted to the memory interface circuit 46 after the value of the counter 53 is not less than the pixel number set in the channel 1 to 3 take-in pixel number setting registers 162, 164, 166 is not written in the memory 70 since the output of the comparator section 152 is "0". Therefore, only the pixel data of the valid pixels outputted by the first to third shift registers 25 to 27 is recorded (stored) in the memory 70.

As a result, the effect similar to that of the third embodiment can be obtained.

MODIFICATION EXAMPLE

For example, in the third embodiment, all the three outputs from the output terminals OUT1 to OUT3 of the CCD sensor 20 are recorded (stored) in the memory 70. However, the channel to be selected by the AFE 75 is commanded with respect to the AFE control block 42, and the channel to be selected in the selector 76 is switched in response to the signal from the AFE control block 42, so that only the pixel data of the signal of one of the channels may be recorded (stored) in the memory 70. Alternatively, only the pixel data of two signals of the channels CH2, CH3 can be recorded (stored) in the memory 70. Accordingly, the pixel data is recorded (stored) with the resolution of the first and second sensors, or with the half of the resolution of the second sensor. In this manner, the data can be acquired with the changed read resolution.

In the third and fourth embodiments, the respective channel 1 to 3 take-in start pixel setting registers 161, 163, 165 and channel 1 to 3 take-in pixel number setting register 162, 164, 166 have "number of take-in start pixels" and "number of take-in start pixels+number of taken pixels" for the respective channels, but these numbers of the respective channels are related to one another.

Figure 13:
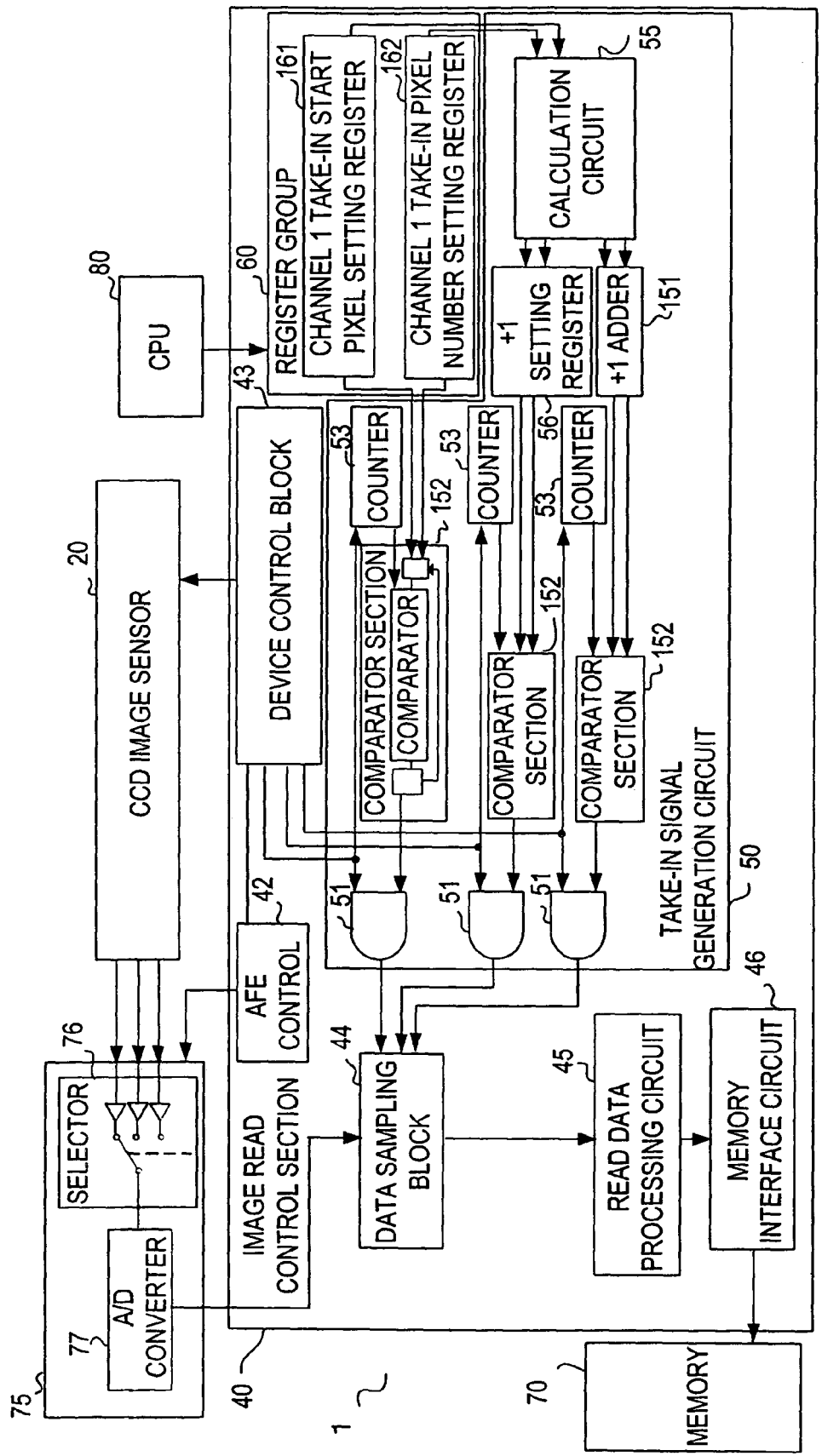
FIG. 13 is a diagram showing the whole constitution of a modification example of the image read apparatus according to the third embodiment.

Therefore, as shown in FIG. 13, for the information in the register group, only the channel 1 take-in start pixel setting register 161 and channel 1 take-in pixel number setting register 162 are disposed. The calculation circuit 55 may be disposed to shift the binary data indicating the values of the channel 1 take-in start pixel setting register 161 and channel 1 take-in pixel number setting register 162 in the direction in which the digit drops by one bit (i.e., to divide the data by 2). The +1 setting register 56 may be disposed in which the values moved outside by the bit shift in the calculation circuit 55 are set ("0" is set, when the value of the channel 1 take-in start pixel setting register 161 is even, and "1" is set, when the value is odd) for the channel CH2. The +1 adder 151 may be disposed which always adds "1" to the value calculated in the calculation circuit 55 for the channel CH3.

Accordingly, the values of the channel 1 take-in start pixel setting register 161 and channel 1 take-in pixel number setting register 162 are calculated in the calculation circuit 55, the values set in the +1 setting register 162 are further added to the calculated values, and the values are used as "number of take-in start pixels" and "number of take-in start pixels+number of taken pixels" of the channel CH2 in the comparator section 152 of the channel CH2. The values of the channel 1 take-in start pixel setting register 161 and channel 1 take-in pixel number setting register 162 are calculated in the calculation circuit 55, and the value obtained by adding "1" to the calculated values are used as "number of take-in start pixels" and "number of take-in start pixels+number of taken pixels" of the channel CH3 in the comparator section 152 of the channel CH3.

Figure 14:
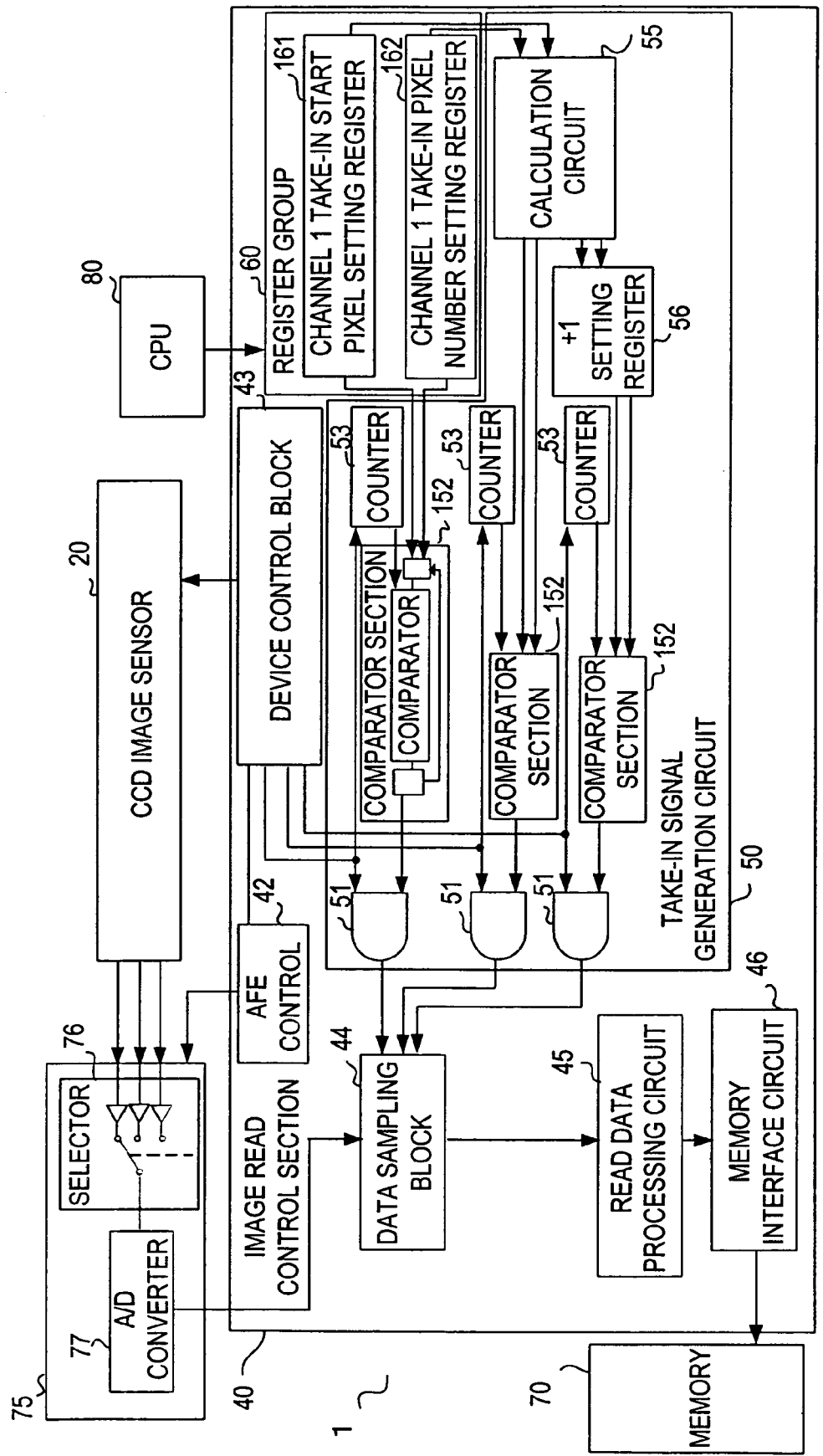
FIG. 14 is a diagram showing the constitution of a modification example of the image read apparatus according to the third embodiment.

Additionally, for example, the image read apparatus may be constituted as shown in FIG. 14 when, in the CCD sensor 20, the valid pixels of the light receiving devices of the first sensor 21 correspond to nine pixels including the seventh to 15th pixels from an output end direction while the valid pixels of the light receiving devices of the second sensor 22 correspond to nine pixels including the sixth to 14th pixels from an output end direction.

That is, as shown in FIG. 14, for the information in the register group, only the channel 1 take-in start pixel setting register 161 and channel 1 take-in pixel number setting register 162 are disposed. The calculation circuit 55 may be disposed to shift the binary data indicating the values of the channel 1 take-in start pixel setting register 161 and channel 1 take-in pixel number setting register 162 in the direction in which the digit drops by one bit (i.e., to divide the data by 2). The +1 setting register 56 may be disposed in which the values moved outside by the bit shift in the calculation circuit 55 are set.

In this case, the values of the channel 1 take-in start pixel setting register 161 and channel 1 take-in pixel number setting register 162 are calculated in the calculation circuit 55, and the calculated values are used as "number of take-in start pixels" and "number of take-in start pixels+number of taken pixels" of the channel CH2 in the comparator section 152 of the channel CH2. The values of the channel 1 take-in start pixel setting register 161 and channel 1 take-in pixel number setting register 162 are calculated in the calculation circuit 55, the values of the +1 setting register 56 are added to the calculated values, and the values are used as "number of take-in start pixels" and "number of take-in start pixels+ number of taken pixels" of the channel CH3 in the comparator section 152 of the channel CH3.

In FIGS. 13 and 14, the values may only be set to the channel 1 take-in start pixel setting register 161 and channel 1 take-in pixel number setting register 162 to provide the satisfactory image read apparatus.

Furthermore, the differences of the number of take-in start pixel and take-in pixel number between the channels CH2 and CH3 are only for one pixel at most. In this case, even when the number of take-in start pixel and take-in pixel number in the channel CH2 are assumed to be the same as those of the channel CH3, there is not a large influence.

Accordingly, the output of the comparator section 152 for the channel CH3 is inputted into the AND device 51 for the channel CH2. The comparator section 152 and counter 53 for the channel CH2 may be omitted. Consequently, the apparatus constitution can further be simplified.

Additionally, as shown by a dotted line in FIG. 8, the signal from the take-in signal generation circuit 50 is inputted into the AFE control block 42, and the A/D converter 77 may be controlled to carry out the operation with respect to the signal of the channel which has received the signal from the take-in signal generation circuit 50. Accordingly, while the invalid data flows, the A/D converter 77 does not operate, and power consumption is reduced.

Moreover, in the third embodiment, the values obtained by adding the number of take-in start pixel and take-in pixel number of the respective channels are stored in the take-in pixel number setting registers 162, 164, 166. However, the values of the take-in pixel numbers may be stored as such in the setting registers 162, 164, 166, so that the added value may be supplied to the comparator section 152 via a circuit for adding the values of the respective setting registers 162, 164, 166 and the take-in start pixel setting registers 161, 163, 165.

What is claimed is:

1. An image read apparatus comprising:
a first sensor including a plurality of light receiving devices arranged in a main scanning direction;
a second sensor which includes a plurality of light receiving devices arranged in the main scanning direction and which is disposed at a predetermined distance from the first sensor in a sub-scanning direction;
a first output unit that outputs a pixel signal obtained from each light receiving device of the first sensor in an arrangement order of the light receiving devices;
a second output unit that outputs pixel signals obtained from even-numbered light receiving devices in the light receiving devices constituting the second sensor in the arrangement order of the light receiving devices;
a third output unit that outputs the pixel signals obtained from odd-numbered light receiving devices in the light receiving devices constituting the second sensor in the arrangement order of the light receiving devices;
a conversion unit that converts the pixel signals from the respective output units into pixel data which are digital signals; and
a pixel data storage unit that stores the pixel data outputted from the conversion unit,
the image read apparatus further comprising:
an information storage unit in which information with respect to the number of pixels outputted per scanning by each output unit is stored for each output; and
a pixel data storage limiting unit that limits the pixel data to be stored in the pixel data storage unit based on the information stored in the information storage unit.

2. The image read apparatus according to claim 1, wherein the first output unit outputs the pixel signals obtained from the respective light receiving devices of the first sensor in an arrangement order of the light receiving devices for a predetermined period,
the second output unit outputs the pixel signals obtained from even-numbered light receiving devices in the light receiving devices constituting the second sensor in the arrangement order of the light receiving devices for the predetermined period,
the third output unit outputs the pixel signals obtained from odd-numbered light receiving devices in the light receiving devices constituting the second sensor in the arrangement order of the light receiving devices for the predetermined period, the information storage unit includes a pixel number information storage unit in which the information with respect to the number of pixels outputted per scanning by each output unit is stored, and the pixel data storage limiting unit limits the pixel data to be stored in the pixel data storage unit based on the pixel number information so that the number of the pixel data stored in the pixel data storage unit agrees with the number of pixels outputted from each output unit.

3. The image read apparatus according to claim 2, wherein the pixel number information storage unit stores information showing the number of pixels outputted per scanning by each output unit as the pixel number information per each output unit.

4. The image read apparatus according to claim 2, wherein information of the number of pixels outputted per scanning by the first output unit is stored as the pixel number information in the pixel number information storage unit, and the pixel data storage limiting unit obtains the number of pixels outputted per scanning by each output unit, and limits the pixel data stored in the pixel data storage unit based on the number of pixels.

5. The image read apparatus according to claim 2, wherein the pixel data storage limiting unit limits the pixel data stored in the pixel data storage unit immediately after the conversion unit outputs the pixel data.

6. The image read apparatus according to claim 2, wherein the pixel data storage unit comprises:

a storage section in which pixel data is stored; and a write unit that writes the pixel data outputted from the conversion unit into the storage section, and the pixel data storage limiting unit limits a write operation of the pixel data into the storage section by the write unit.

7. The image read apparatus according to claim 2, wherein the conversion unit is constituted to execute the conversion of the pixel signal from each output unit into the pixel data in accordance with a conversion command inputted from the outside, and the pixel data storage limiting unit controls input of the conversion command into the conversion unit so that the conversion unit converts only the pixel signal outputted from each output unit into the pixel data.

8. The image read apparatus according to claim 1, wherein respective ranges of the light receiving devices that output valid pixel signals is defined in the first and second sensors, the information storage unit includes a start pixel information storage unit in which start pixel information with respect to the number of pixels required until the valid pixel signal starts to be outputted in the pixel signals outputted per scanning by each output unit is stored, and the pixel data storage limiting unit limits the pixel data to be stored per scanning by each output unit based on the start pixel information.

9. The image read apparatus according to claim 8, wherein the start pixel information storage unit stores information showing the number of pixels required until the valid pixel signal starts to be outputted in the pixel signals outputted per scanning by each output unit as the start pixel information per each output unit.

10. The image read apparatus according to claim 8, wherein information of the pixel number required until the valid pixel signal starts to be outputted in the output per scanning by the first output unit is stored as the start pixel information in the start pixel information storage unit, and the pixel data storage limiting unit obtains the pixel number required until the valid pixel signal starts to be outputted in the output per scanning by each output unit from the start pixel information, and limits the pixel data stored in the pixel data storage unit based on the number of pixels.

11. The image read apparatus according to claim 8, wherein the information storage unit includes a pixel number information storage unit in which pixel number information with respect to the number of valid pixels outputted per scanning by each output unit is stored, and the pixel data storage limiting unit limits the pixel data to be stored per scanning by each output unit based on the start pixel information and pixel number information so as to prevent the pixel data storage unit from storing pixel data after end of the output of the valid pixel signal.

12. The image read apparatus according to claim 11, wherein the number of valid pixels outputted per scanning by the first output unit is stored as the pixel number information in the pixel number information storage unit, and the pixel data storage limiting unit obtains the number of valid pixels outputted per scanning by each output unit from the pixel number information, and limits the pixel data to be stored by the pixel data storage unit based on the number of valid pixel signals.

13. The image read apparatus according to claim 8, wherein the pixel data storage limiting unit limits the pixel data to be stored by the pixel data storage unit immediately after the conversion unit outputs the pixel data.

14. The image read apparatus according to claim 8, wherein the pixel data storage unit comprises: a storage section in which the pixel data is stored; and a write unit for writing pixel data outputted from the conversion unit into the storage section, and the pixel data storage limiting unit limits a write operation of the pixel data into the storage section by the write unit.

15. The image read apparatus according to claim 8, wherein the conversion unit is constituted to execute the conversion of the pixel signal from each output unit into the pixel data in accordance with a conversion command inputted from the outside, and the pixel data storage limiting unit limits input of a conversion command into the conversion unit so that the conversion unit converts the pixel signal corresponding to the valid pixel signal into the pixel data.

* * * * *